(12) United States Patent
Weber et al.

(10) Patent No.: US 9,551,818 B2
(45) Date of Patent: Jan. 24, 2017

(54) APODIZED BROADBAND PARTIAL REFLECTORS HAVING DIFFERING OPTICAL PACKETS

(71) Applicant: 3M INNOVATIVE PROPERTIES COMPANY, St. Paul, MN (US)

(72) Inventors: Michael F. Weber, Shoreview, MN (US); Timothy J. Nevitt, Red Wing, MN (US); John A. Wheatley, Lake Elmo, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 99 days.

(21) Appl. No.: 14/352,883

(22) PCT Filed: Oct. 17, 2012

(86) PCT No.: PCT/US2012/060485
§ 371 (c)(1),
(2) Date: Apr. 18, 2014

(87) PCT Pub. No.: WO2013/059228
PCT Pub. Date: Apr. 25, 2013

(65) Prior Publication Data
US 2014/0268346 A1    Sep. 18, 2014

Related U.S. Application Data

(60) Provisional application No. 61/549,614, filed on Oct. 20, 2011.

(51) Int. Cl.
*G02B 5/28* (2006.01)
*G02B 5/30* (2006.01)
(Continued)

(52) U.S. Cl.
CPC ............. *G02B 5/281* (2013.01); *G02B 5/0841* (2013.01); *G02B 5/285* (2013.01); *G02B 5/287* (2013.01);
(Continued)

(58) Field of Classification Search
CPC .................... G02B 5/281; G02B 5/285–5/288; G02B 5/0841; G02B 5/305; G02B 5/3041; G02B 27/142
See application file for complete search history.

(56) References Cited

U.S. PATENT DOCUMENTS 3,247,392 A    4/1966   Thelen
3,610,729 A    10/1971  Rogers
(Continued)

FOREIGN PATENT DOCUMENTS

WO    WO 99-36258      7/1999
WO    WO 2008-144636   11/2008
(Continued)

OTHER PUBLICATIONS

Schrenk, "Nanolayer Polymeric Optical Films," Tappi Journal, Jun. 1992, pp. 169-174.
(Continued)

*Primary Examiner* — Pascal M Bui Pho
*Assistant Examiner* — Cara Rakowski
(74) *Attorney, Agent, or Firm* — Daniel J. Iden

(57) ABSTRACT

A broadband partial reflector includes a first multilayer polymeric optical film having a total number of optical repeating units from a first side to a second side of the first multilayer polymeric optical film and a second multilayer polymeric optical film having a total number of optical repeating units from a first side to a second side of the second multilayer polymeric optical film and an intermediate layer on the second side of the multilayer polymeric
(Continued)

optical film separates the first multilayer polymeric optical film from the second multilayer polymeric optical film. The first multilayer polymeric optical film has a first baseline optical repeating unit thickness profile and a first apodized optical repeating unit thickness profile monotonically deviating from the first baseline optical repeating unit thickness profile and defining the second side of the first multilayer polymeric optical film. The second multilayer polymeric optical film has a second baseline optical repeating unit thickness profile and a second apodized optical repeating unit thickness profile monotonically deviating from the second baseline optical repeating unit thickness profile and defining the first side of the second multilayer polymeric optical film.

17 Claims, 22 Drawing Sheets

(51) Int. Cl.
  *G02B 5/08* (2006.01)
  *G02B 27/14* (2006.01)
(52) U.S. Cl.
  CPC ............ *G02B 5/305* (2013.01); *G02B 5/3041* (2013.01); *G02B 27/142* (2013.01)

(56) References Cited

U.S. PATENT DOCUMENTS

| | | |
|---|---|---|
| 4,446,305 A | 5/1984 | Rogers |
| 5,103,337 A | 4/1992 | Schrenk |
| 5,126,880 A | 6/1992 | Wheatley |
| 5,360,659 A | 11/1994 | Arends |
| 5,486,949 A | 1/1996 | Schrenk |
| 5,882,774 A | 3/1999 | Jonza |
| 6,157,490 A | 12/2000 | Wheatley |
| 6,179,948 B1 | 1/2001 | Merrill |
| 6,352,761 B1 | 3/2002 | Hebrink |
| 6,531,230 B1 | 3/2003 | Weber |
| 6,667,095 B2 | 12/2003 | Wheatley |
| 6,783,349 B2 | 8/2004 | Neavin |
| 6,788,463 B2 | 9/2004 | Merrill |
| 6,927,900 B2 | 8/2005 | Liu |
| 7,019,905 B2 | 3/2006 | Weber |
| 7,138,173 B2 | 11/2006 | Wheatley |
| 7,265,905 B2 * | 9/2007 | Wada ................ G02B 5/208 359/584 |
| 7,385,763 B2 | 6/2008 | Nevitt |
| 7,636,193 B2 | 12/2009 | Bellanca |
| 7,652,736 B2 | 1/2010 | Padiyath |
| 7,791,687 B2 | 9/2010 | Weber |
| 7,851,054 B2 | 12/2010 | Weber |
| 7,991,687 B2 | 8/2011 | Highland |
| 8,523,419 B2 | 9/2013 | Nevitt |
| 2001/0009714 A1 | 7/2001 | Wheatley |
| 2002/0154406 A1 | 10/2002 | Merrill |
| 2005/0079333 A1 | 4/2005 | Wheatley |
| 2005/0243425 A1 * | 11/2005 | Wheatley ............ G02B 5/282 359/589 |
| 2008/0151147 A1 | 6/2008 | Weber |
| 2011/0272849 A1 | 11/2011 | Neavin |
| 2012/0206806 A1 | 8/2012 | Webber |
| 2012/0275023 A1 | 11/2012 | Webber |
| 2013/0042964 A1 | 2/2013 | Neavin |
| 2013/0063818 A1 | 3/2013 | Weber |
| 2013/0250405 A1 | 9/2013 | Kivel |

FOREIGN PATENT DOCUMENTS

| | | |
|---|---|---|
| WO | WO 2008-144656 | 11/2008 |
| WO | WO 2011-050226 | 4/2011 |
| WO | WO 2011-050268 | 4/2011 |
| WO | WO 2011-139618 | 11/2011 |
| WO | WO 2011-146288 | 11/2011 |
| WO | WO 2013-059226 | 4/2013 |
| WO | WO 2013-059231 | 4/2013 |

OTHER PUBLICATIONS

International Search Report for International PCT Application No. PCT/US2012/060485 mailed on Apr. 11, 2013, 6 pages.

* cited by examiner

APODIZED BROADBAND PARTIAL REFLECTORS HAVING DIFFERING OPTICAL PACKETS

FIELD

The present disclosure relates to, among other things, an optical film construction with differing optical packets that provides a smooth spectrum for the in-band transmitted and reflected light of broadband partial reflectors.

BACKGROUND

Multilayer optical films are known. Such films can incorporate a large number of thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

More recently, researchers from 3M Company have pointed out the significance of layer-to-layer refractive index characteristics of such films along the direction perpendicular to the film, i.e., the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta nz$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

Some multilayer optical films are designed for narrow band operation, i.e., over a narrow range of wavelengths, while others are designed for use over a broad wavelength range such as substantially the entire visible or photopic spectrum, or the visible or photopic wavelength range together with near infrared wavelengths, for example. Over the years, designers and manufacturers of the latter type of films, i.e., broadband multilayer optical films, have had to deal with the issue of color. The color issue often arises when the film is intended for use in a visual display system, e.g., where the film is a broadband reflective polarizer or a broadband mirror, and the display system is a liquid crystal display, luminaire, or backlight. A broadband reflector generally includes a multilayer polymeric optical film having a total number of optical repeating units that monotonically increases in thickness value from a first side to a second side of the multilayer polymeric optical film. This arrangement of layer thicknesses is referred to as a graded layer thickness profile. In such systems, it is typically undesirable for the film to impart a significant colored (non-white) appearance to the display, whether at normal incidence or for obliquely incident light. The colored appearance occurs when the film has transmission or reflection characteristics that are not uniform over the visible portion of the spectrum. In the case of coextruded polymeric multilayer optical films, such non-uniformities are typically the result of imperfect control of the layer thickness profile of the film relative to a target profile. To avoid the color issue, polymeric multilayer optical films are often designed to provide along their principal axes either extremely low reflectivity and high transmission (e.g., for a pass axis of a reflective polarizer that is viewed in transmission) or extremely high reflectivity and low transmission (e.g., for a block axis of a reflective polarizer, or for any in-plane axis of a reflective mirror film that is viewed in reflection).

Recently, broadband polymeric multilayer optical films have been proposed that have intermediate amounts of reflectivity and transmission for light polarized parallel to at least one principal optic axis so that some significant amount of incident light is reflected, and another significant amount of the incident light (typically, the remainder of the incident light that is not reflected) is transmitted. Such films are referred to herein as partially reflecting multilayer optical films, or partially transmitting multilayer optical films. One approach to addressing color issues in such films is to provide them with only a single packet of microlayers with a carefully tailored layer thickness profile, and to manufacture them without the use of any layer multiplier devices, to provide maximum control of the layer thickness profile and a corresponding minimum spectral variability in transmission or reflection over the visible wavelength range. However even a carefully tailored layer thickness profile does not reduce color issues resulting from in-band ringing.

BRIEF SUMMARY

The present disclosure describes apodized broadband reflectors with differing optical packets that exhibit reduced in-band spectral ringing, among other things.

In many embodiments, a broadband partial reflector includes a first multilayer polymeric optical film having a total number of optical repeating units from a first side to a second side of the first multilayer polymeric optical film, the first multilayer polymeric optical film having a first baseline optical repeating unit thickness profile and a first apodized optical repeating unit thickness profile monotonically deviating from the first baseline optical repeating unit thickness profile and defining the second side of the first multilayer polymeric optical film. The reflector also includes an intermediate layer on the second side of the multilayer polymeric optical film; and a second multilayer polymeric optical film having a total number of optical repeating units from a first side to a second side of the second multilayer polymeric optical film, the second multilayer polymeric optical film having a second baseline optical repeating unit thickness profile and a second apodized optical repeating unit thickness profile monotonically deviating from the second baseline optical repeating unit thickness profile and defining the first side of the second multilayer polymeric optical film. The first side of the second multilayer polymeric optical film can be positioned on the intermediate layer such that the intermediate layer separates the first multilayer polymeric optical film from the second multilayer polymeric optical film.

In other embodiments, a broadband partial reflector includes a first multilayer polymeric optical film having a total number of optical repeating units that monotonically increases in thickness value from a first side to a second side of the first multilayer polymeric optical film, the first multilayer polymeric optical film having a first baseline optical repeating unit thickness profile and a first apodized optical repeating unit thickness profile monotonically deviating from the first baseline optical repeating unit thickness profile and defining the second side of the first multilayer polymeric optical film. The reflector also includes an intermediate layer on the second side of the multilayer polymeric optical film; and a second multilayer polymeric optical film having a total number of optical repeating units that monotonically increases in thickness value from a first side to a second side of the second multilayer polymeric optical film, the second multilayer polymeric optical film having a second baseline optical repeating unit thickness profile and a second apodized optical repeating unit thickness profile monotonically deviating from the second baseline optical repeating unit thickness profile and defining the first side of the second multilayer polymeric optical film. The first side of the second multilayer polymeric optical film can be positioned on the intermediate layer such that the intermediate layer separates the first multilayer polymeric optical film from the second multilayer polymeric optical film.

In other embodiments, a broadband partial reflector includes a first multilayer polymeric optical film having a total number of optical repeating units from a first side to a second side of the first multilayer polymeric optical film and formed from a first material set, the first multilayer polymeric optical film having a first baseline optical repeating unit thickness profile and a first apodized optical repeating unit thickness profile monotonically deviating from the first baseline optical repeating unit thickness profile and defining the second side of the first multilayer polymeric optical film. The reflector also includes an intermediate layer on the second side of the multilayer polymeric optical film; and a second multilayer polymeric optical film having a total number of optical repeating units from a first side to a second side of the second multilayer polymeric optical film and formed from a second material set being different than the first material set, the second multilayer polymeric optical film having a second baseline optical repeating unit thickness profile and a second apodized optical repeating unit thickness profile monotonically deviating from the second baseline optical repeating unit thickness profile and defining the first side of the second multilayer polymeric optical film. The first side of the second multilayer polymeric optical film can be positioned on the intermediate layer such that the intermediate layer separates the first multilayer polymeric optical film from the second multilayer polymeric optical film.

The optical film (e.g., broadband partial reflector), and film articles described herein may provide one or more advantages over prior optical films or film articles. For example, prior broadband partial reflectors were susceptible to in-band ringing, while the broadband partial reflectors described herein may substantially eliminate in-band ringing. Accordingly, the broadband partial reflectors described herein provide a smooth spectrum for the in-band transmitted and reflected light. These and other advantages of the various embodiments of the devices and methods described herein will be readily apparent to those of skill in the art upon reading the disclosure presented herein.

BRIEF DESCRIPTION OF THE DRAWINGS

The disclosure may be more completely understood in consideration of the following detailed description of various embodiments of the disclosure in connection with the accompanying drawings, in which.

Figure 1:
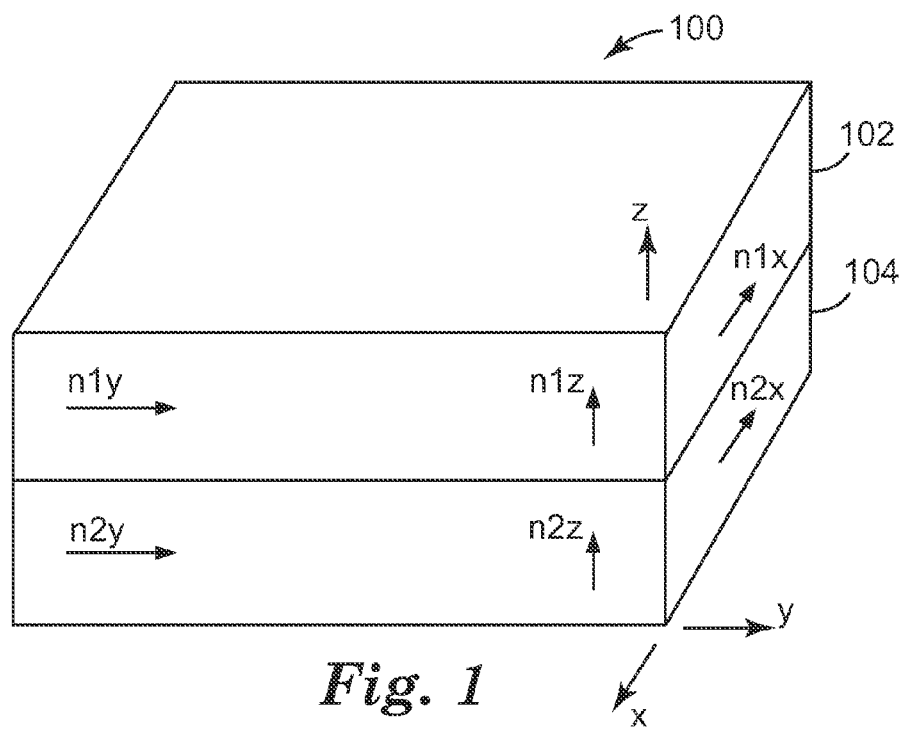
FIG. 1 is a schematic perspective view of an exemplary optical repeat unit (ORU) of a multilayer optical film.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The present disclosure describes, among other things, an optical film construction that provides a smooth spectrum for the in-band transmitted and reflected light of broadband partial reflectors. As described herein, the broadband partial reflectors described herein may substantially eliminate in-band ringing. Accordingly, the broadband partial reflectors described herein provide a smooth spectrum for the in-band transmitted and reflected light. It has been found that broadband partial reflector optical film that has an apodized graded thickness profile reduces or substantially eliminates in-band spectrum ringing and consequentially reduces or substantially eliminates undesired color. The term "apodization," sometimes referred to as "tapering," is derived from a class of mathematical techniques that generally are applied in the fields of signal processing, electromagnetics and optics. When physical structures interact with electromagnetic fields, such as a polymeric multilayer optical film interacting with infrared, visible, and/or ultraviolet light, spectral features will generally occur that are the result of the discontinuities associated with the terminations of a graded, resonant layer profile. For the present disclosure, we use the term apodization to describe a technique to terminate a graded layer thickness profile so as to minimize undesirable spectral features such as spectral ringing.

The broadband partial reflectors described herein may be used for any suitable purpose, including but not limited to optical displays, optical graphics or the like. While the present disclosure is not so limited, an appreciation of various aspects of the disclosure will be gained through a discussion of the examples provided below.

As mentioned above, one challenge faced by designers and manufacturers of polymeric multilayer optical films that are intended to be both (1) partially reflecting along a principal axis at normal and oblique angles and (2) broadband (i.e., intended to provide partial reflectivity over a broad wavelength range) is unintended and undesired color. Such undesired color can be manifested as relatively high frequency variability in the optical transmission and reflection spectra. For purposes of the figures illustrated and described herein, for simplicity, the multilayer optical film bodies are assumed to have no spatial variability in the plane of the film body. Thus, the spectral reflection and transmission characteristics of a given film body are assumed to be independent of the position or location on the film (e.g., the (x,y) coordinate) at which they are measured.

Referring now to FIG. 1, a schematic perspective view of an exemplary optical repeat unit (ORU) of a multilayer optical film is illustrated. FIG. 1 depicts only two layers of a multilayer optical film 100, which can include tens or hundreds of such layers arranged in one or more contiguous packets or stacks. The film 100 includes individual microlayers 102, 104, where "microlayers" refer to layers that are sufficiently thin so that light reflected at a plurality of interfaces between such layers undergoes constructive or destructive interference to give the multilayer optical film the desired reflective or transmissive properties. The microlayers 102, 104 can together represent one optical repeat unit (ORU) of the multilayer stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 micrometer. Thicker layers can, however, also be included, such as skin layers at the outer surfaces of the film, or protective boundary layers (PBL) disposed within the film that separate packets of microlayers, as desired.

Refractive indices of one of the microlayers (e.g. layer 102 of FIG. 1, or the "A" layers of FIG. 2 below) for light polarized along principal x-, y-, and z-axes are n1x, n1y, and n1z, respectively. The mutually orthogonal x-, y-, and z-axes can, for example, correspond to the principal directions of the dielectric tensor of the material. In many embodiments, and for discussion purposes, the principle directions of the different materials are coincident, but this need not be the case in general. The refractive indices of the adjacent microlayer (e.g. layer 104 in FIG. 1, or the "B" layers in FIG. 2) along the same axes are n2x, n2y, n2z, respectively. The differences in refractive index between these layers are $\Delta nx$ (=n1x−n2x) along the x-direction, $\Delta ny$ (=n1y−n2y) along the y-direction, and $\Delta nz$ (=n1z−n2z) along the z-direction. The nature of these refractive index differences, in combination with the number of microlayers in the film (or in a given stack of the film) and their thickness distribution, control the reflective and transmissive characteristics of the film (or of the given stack of the film). For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. A reflective polarizer may be considered to be an optical body that strongly reflects normally incident light that is polarized along one in-plane axis, referred to as the "block axis," if the wavelength is within the reflection band of the packet, and strongly transmits such light that is polarized along an orthogonal in-plane axis, referred to as the "pass axis."

If desired, the refractive index difference ($\Delta nz$) between adjacent microlayers for light polarized along the z-axis can also be tailored to achieve desirable reflectivity properties for the p-polarization component of obliquely incident light. To maintain near on-axis reflectivity of p-polarized light at oblique angles of incidence, the z-index mismatch $\Delta nz$ between microlayers can be controlled to be substantially less than the maximum in-plane refractive index difference $\Delta nx$, such that $\Delta nz \leq 0.5*\Delta nx$. Alternatively, $\Delta nz \leq 0.25*\Delta nx$. A zero or near zero magnitude z-index mismatch yields interfaces between microlayers whose reflectivity for p-polarized light is constant or near constant as a function of incidence angle. Furthermore, the z-index mismatch $\Delta nz$ can be controlled to have the opposite polarity compared to the in-plane index difference $\Delta nx$, i.e., $\Delta nz<0$. This condition yields interfaces whose reflectivity for p-polarized light increases with increasing angles of incidence, as is the case for s-polarized light. If $\Delta nz>0$, then the reflectivity for p-polarized light decreases with angle of incidence. The foregoing relationships also of course apply to relationships involving $\Delta nz$ and $\Delta ny$, e.g., in cases where significant reflectivity and transmission are desired along two principal in-plane axes (such as a balanced or symmetric partially reflecting mirror film, or a partial polarizing film whose pass axis has significant reflectivity at normal incidence).

Figure 2:
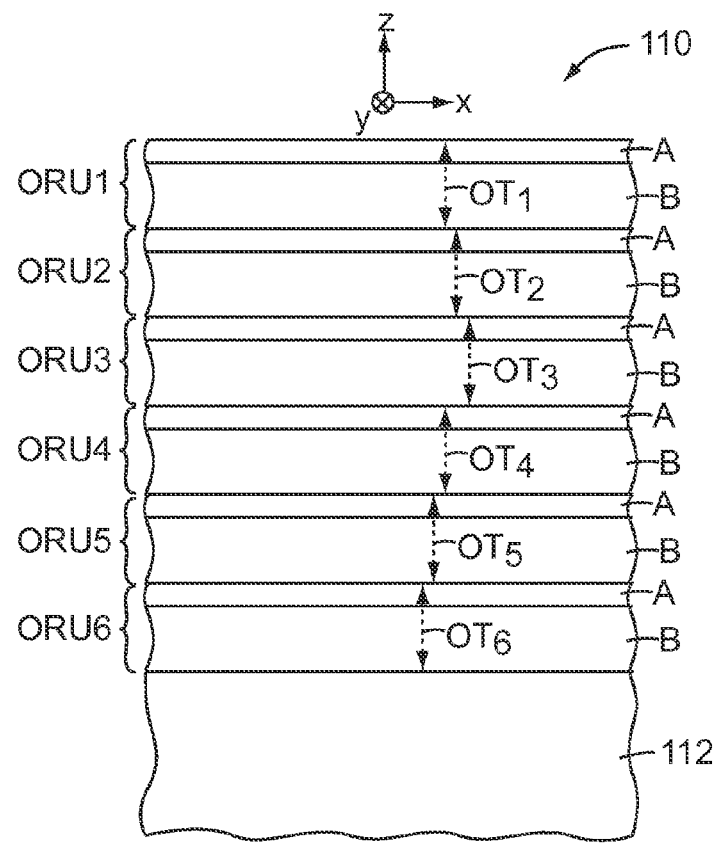
FIG. 2 is a schematic perspective view of a portion of a multilayer optical film, this view showing a packet of microlayers and a plurality of ORUs.

In the schematic side view of FIG. 2, more interior layers of a multilayer film 110 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film.

In FIG. 2, the microlayers are labeled "A" or "B," the "A" layers being composed of one material and the "B" layers being composed of a different material, these layers being stacked in an alternating arrangement to form optical repeat units or unit cells ORU 1, ORU 2, . . . ORU 6 as shown. In many embodiments, a multilayer optical film composed entirely of polymeric materials would include many more than 6 optical repeat units if high reflectivities are desired. The multilayer optical film 110 is shown as having a substantially thicker layer 112, which may represent an outer skin layer, or a protective boundary layer ("PBL," see U.S. Pat. No. 6,783,349 (Neavin et al.)) that separates the stack of microlayers shown in the figure from another stack or packet of microlayers (not shown). If desired, two or more separate multilayer optical films can be laminated together, e.g., with one or more thick adhesive layers, or using pressure, heat, or other methods to form a laminate or composite film.

In some cases, the microlayers can have thicknesses and refractive index values corresponding to a ¼-wave stack, i.e., arranged in ORUs each having two adjacent microlayers of equal optical thickness (f-ratio=50%, the f-ratio being the ratio of the optical thickness of a constituent layer "A" to the optical thickness of the complete optical repeat unit), such ORU being effective to reflect by constructive interference light whose wavelength $\lambda$ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. For purposes of the present application, we contemplate multilayer optical films whose f-ratio may be any suitable value, and do not limit ourselves to films whose f-ratio of 50%. Accordingly, in the embodiment of FIG. 2, the "A" layers are depicted for generality as being thinner than the "B" layers. Each depicted optical repeat unit (ORU 1, ORU 2, etc.) has an optical thickness (OT1, OT2, etc.) equal to the sum of the optical thicknesses of its constituent "A" and "B" layer, and each optical repeat unit reflects light whose wavelength $\lambda$ is twice its overall optical thickness.

In exemplary embodiments, the optical thicknesses of the ORUs differ according to a thickness gradient along the z-axis or thickness direction of the film, whereby the optical thickness of the optical repeat units increases, decreases, or follows some other functional relationship as one progresses from one side of the stack (e.g., the top) to the other side of the stack (e.g., the bottom). Such thickness gradients can be used to provide a widened reflection band to provide substantially spectrally flat transmission and reflection of light over the extended wavelength band of interest, and also over all angles of interest. Alternatively, the layer thickness gradient of the disclosed packets of microlayers may be deliberately tailored to provide reflection and transmission spectra that change significantly over the wavelength range of interest. For example, it may be desirable for the multilayer optical film body to transmit (or reflect) more blue light than red light, or vice versa, or to transmit (or reflect) more green light than blue light and red light. Although such desired spectral non-uniformities may cause the multilayer optical film body to exhibit a colored (non-clear or non-neutral) appearance, this desired color is often distinguishable from the undesired color discussed elsewhere herein in that the desired color is associated with relatively slow changes in the spectral reflection or transmission, whereas the undesired color is associated with faster changes in those parameters as a function of wavelength. For example, spectral non-uniformities in reflection or transmission associated with desired color may vary as a function of wavelength with characteristic periods of about 100 nm or greater, whereas spectral non-uniformities in reflection or transmission associated with undesired color may vary as a function of wavelength with characteristic periods of less than about 50 nm, although this number depends somewhat on the magnitude of localized disruptions in the layer thickness profile.

To achieve reflectivity with a reasonable number of layers, adjacent microlayers may exhibit a difference in refractive index ($\Delta nx$) for light polarized along the x-axis of at least 0.03, for example. If high reflectivity is desired for two orthogonal polarizations, then the adjacent microlayers also may exhibit a difference in refractive index ($\Delta ny$) for light polarized along the y-axis of at least 0.03, for example. In some cases, adjacent microlayers may have refractive index mismatches along the two principal in-plane axes ($\Delta nx$ and $\Delta ny$) that are close in magnitude, in which case the film or packet may behave as an on-axis mirror or partial mirror. Alternatively, for reflective polarizers that are designed to be partially reflective for the pass axis polarization, adjacent microlayers may exhibit a large difference in refractive index ($\Delta nx$) for light polarized along the x-axis and a smaller but still substantial difference in refractive index ($\Delta ny$) for light polarized along the y-axis. In variations of such embodiments, the adjacent microlayers may exhibit a refractive index match or mismatch along the z-axis ($\Delta nz=0$ or $\Delta nz$ large), and the mismatch may be of the same or opposite polarity or sign as the in-plane refractive index mismatch (es). Such tailoring of $\Delta nz$ plays a key role in whether the reflectivity of the p-polarized component of obliquely incident light increases, decreases, or remains the same with increasing incidence angle.

Although the examples herein describe reflectors whose reflectivity increases with angle of incidence, partial reflectors whose reflectivity along a given principal axis decreases with angle of incidence can be made with reduced color using the same techniques described herein. This is particularly important for films whose reflectivity is large at normal incidence and are viewed in transmitted light at various angles, including normal incidence.

At least some of the microlayers in at least one packet of the disclosed multilayer optical films may if desired be birefringent, e.g., uniaxially birefringent or biaxially birefringent, although in some embodiments, microlayers that are all isotropic may also be used. In some cases, each ORU may include one birefringent microlayer, and a second microlayer that is either isotropic or that has a small amount of birefringence relative to the other microlayer. In alternative cases, each ORU may include two birefringent microlayers.

Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,949 (Merrill et al.) "Optical Film and Process for Manufacture Thereof", U.S. Pat. No. 6,783,349 (Neavin et al.) "Apparatus for Making Multilayer Optical Films", and U.S. Patent Application 61/332,401 entitled "Feedblock for Manufacturing Multilayer Polymeric Films", filed May 7, 2010. The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method can include: (a) providing at least a first and a second stream of resin corresponding to the first and second polymers to be used in the finished film; (b) dividing the first and the second streams into a plurality of layers using a suitable feedblock, such as one that includes: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. A multilayer optical film with controlled low frequency variations in reflectivity and transmission over a wide wavelength range can be achieved by the thermal zone control of the axial rod heater, see e.g., U.S. Pat. No. 6,783,349 (Neavin et al.).

In some cases, the fabrication equipment may employ one or more layer multipliers to multiply the number of layers in the finished film. In other embodiments, the films can be manufactured without the use of any layer multipliers. Although layer multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile, for low transmitted and reflected color, can be difficult to make using multi-packet films manufactured using multipliers. If the number of layers in a single packet generated directly in a feedblock do not provide sufficient reflectivity, then two or more such films can be attached to increase the reflectivity. Further discussion of layer thickness control, so as to provide smooth spectral reflectivity and transmission for low color films, is provided in PCT publication WO 2008/144656 (Weber et al.).

If the optical thicknesses of all of the microlayers in a given multilayer film were designed to be the same, the film would provide high reflectivity over only a narrow band of wavelengths. Such a film would appear highly colored if the band was located somewhere in the visible spectrum, and the color would change as a function of angle. In the context of display and lighting applications, films that exhibit noticeable colors are generally avoided, although in some cases it may be beneficial for a given optical film to introduce a small amount of color to correct for color imbalances elsewhere in the system. Exemplary multilayer optical film bodies are provided with broadband reflectivity and transmission, e.g., over the entire visible spectrum, by tailoring the microlayers—or more precisely, the optical repeat units (ORUs), which in many (but not all) embodiments correspond to pairs of adjacent microlayers—to have a range of optical thicknesses. Typically, the microlayers are arranged along the z-axis or thickness direction of the film from a thinnest ORU on one side of the film or packet to a thickest ORU on the other side, with the thinnest ORU reflecting the shortest wavelengths in the reflection band and the thickest ORU reflecting the longest wavelengths.

After the multilayer web is cooled on the chill roll, it can be drawn or stretched to produce a finished or near-finished multilayer optical film. The drawing or stretching accomplishes two goals: it thins the layers to their desired final thicknesses, and it may orient the layers such that at least some of the layers become birefringent. The orientation or stretching can be accomplished along the cross-web direction (e.g., via a tenter), along the down-web direction (e.g., via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

In reference to traditional polarizing films, light can be considered to be polarized in two orthogonal planes, where the electric vector of the light, which is transverse to the propagation of the light, lies within a particular plane of polarization. In turn, the polarization state of a given light ray can be resolved into two different polarization states: p-polarized and s-polarized light. P-pol light is polarized in the plane of incidence of the light ray and a given surface, where the plane of incidence is a plane containing both the local surface normal vector and the light ray propagation direction or vector.

Figure 3:
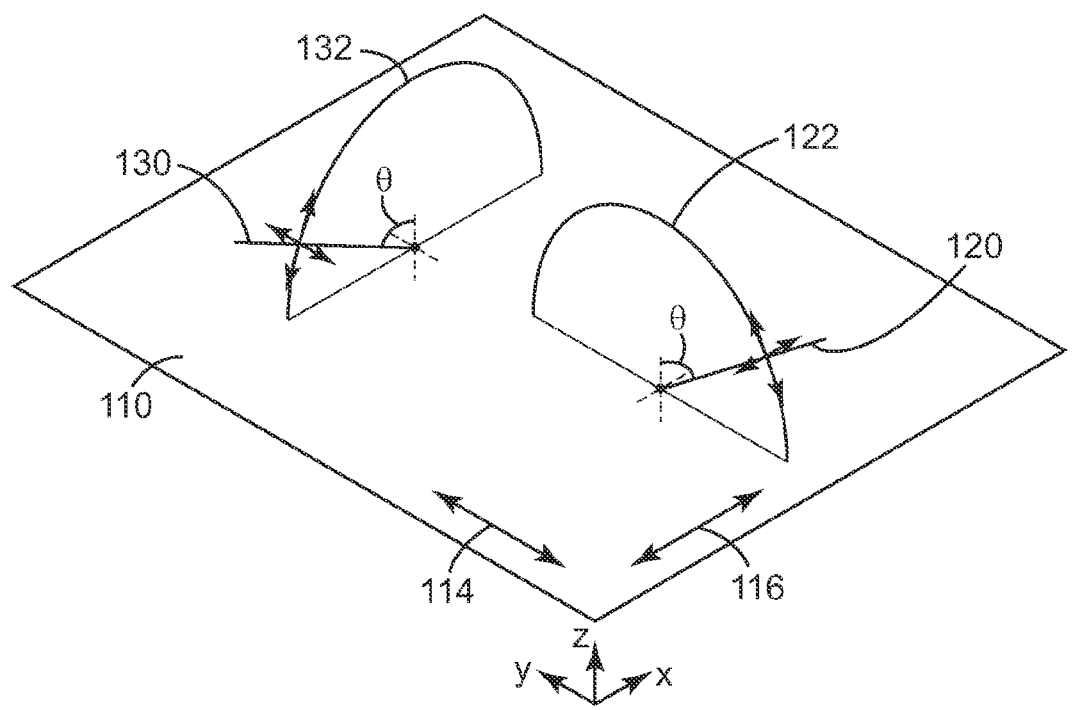
FIG. 3 is a schematic perspective view of a reflective polarizing film.

FIG. 3 is a schematic perspective view of a reflective polarizing film. FIG. 3 illustrates a light ray 130 that is incident on a polarizer 110 at an angle of incidence 8, thereby forming a plane of incidence 132. The polarizer 110 includes a pass axis 114 that is parallel to the y-axis, and a block axis 116 that is parallel to the x-axis. The plane of incidence 132 of ray 130 is parallel to the block axis 116. Ray 130 has a p-polarized component that is in the plane of incidence 132, and an s-polarized component that is orthogonal to the plane of incidence 132. The p-pol light of ray 130 will be substantially reflected by the polarizer, while the s-pol light of ray 130 is, at least in part, transmitted.

Further, FIG. 3 illustrates ray 120 that is incident on polarizer 100 in a plane of incidence 122 that is parallel to the pass axis 114 of the polarizer 110. As a result, assuming that the polarizer 110 is a perfect polarizer that has a reflectance of 100% at all angles of incident light for light polarized in the block axis and 0% at all angles of incident light for light polarized in the pass axis, the polarizer transmits s-pol light of ray 130 and the p-pol light of ray 120, while reflecting the p-pol light of ray 130 and the s-pol light of ray 120. In other words, the polarizer 110 will transmit a combination of p- and s-pol light. The amount of transmission and reflection of p- and s-pol light will depend on the characteristics of the polarizer as is further described herein.

Figure 4:
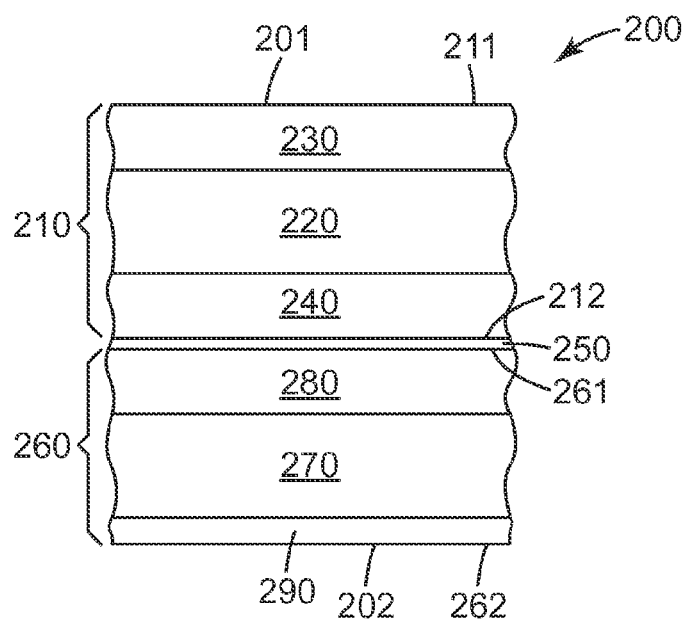
FIG. 4 is a schematic cross-sectional view of a broadband partial reflector having differing optical packets.

FIG. 4 is a schematic cross-sectional view of a broadband partial reflector 200. A broadband partial reflector 200 includes a first multilayer polymeric optical film 210 and a second multilayer polymeric optical film 260 separated by an intermediate layer 250.

The first multilayer polymeric optical film 210 has a total number of optical repeating units that increases in thickness value from a first side 211 to a second side 212 of the multilayer polymeric optical film 210. In many embodiments, the first multilayer polymeric optical film 210 has a total number of optical repeating units that monotonically increases in thickness value from a first side 211 to a second side 212 of the multilayer polymeric optical film 210. In many embodiments, the total number of optical repeating units is in a range from 50 to 1000 or from 100 to 300. In many embodiments, the first multilayer polymeric optical film 210 reflects 10-90% of visible or IR light over a band of at least 100 nm width or a band of over at least 200 nm width or a band of at least 300 nm width.

The first multilayer polymeric optical film 210 has a baseline optical repeating unit thickness profile 220 and a first apodized optical repeating unit thickness profile 240. The first apodized optical repeating unit thickness profile 240 defines the second side 212 of the first multilayer polymeric optical film 210. The second side 212 of the first multilayer polymeric optical film 210 is disposed on or in contact with the intermediate layer 250. The first apodized optical repeating unit thickness profile 240 monotonically deviates from the baseline optical repeating unit thickness profile 220. In some embodiments, the first apodized optical repeating unit thickness profile 240 monotonically and exponentially deviates from the baseline optical repeating unit thickness profile 220.

The baseline optical repeating unit thickness profile 220 is defined by a plurality of optical repeating units and having a first average slope. The first apodized thickness profile 240 has a second average slope being at least 5 times greater than the first average slope. In many embodiments, the second average slope is at least 10 times greater than the first average slope. The first apodized thickness profile 240 is in a range from 3 to 15% or in a range from 5-10% of the total number of optical repeating units, or can contain from 4-20 of the total number of optical repeating units forming the first multilayer polymeric optical film 210.

In some embodiments, another apodized optical repeating unit thickness profile 230 defines the first side 211 of the first multilayer polymeric optical film 210 and joins the baseline optical repeating unit thickness profile 220. This additional apodized optical repeating unit thickness profile 230 can have from 3-15% or from 5-10% of the total number of optical repeating units, or may contain from 4 to 20 of the total number of optical repeating units that form the first multilayer polymeric optical film 210. The other apodized optical repeating unit thickness profile 230 monotonically deviates from the baseline optical repeating unit thickness profile 220. In some embodiments, the other apodized optical repeating unit thickness profile 230 monotonically and exponentially deviates from the baseline optical repeating unit thickness profile 220.

The second multilayer polymeric optical film 260 has a total number of optical repeating units that increases in thickness value from a first side 261 to a second side 262 of the second multilayer polymeric optical film 260. In many embodiments, the second multilayer polymeric optical film 260 has a total number of optical repeating units that monotonically increases in thickness value from a first side 261 to a second side 262 of the multilayer polymeric optical film 260. In many embodiments, the total number of optical repeating units is in a range from 50 to 1000 or from 100 to 300. In many embodiments, the second multilayer polymeric optical film 260 reflects 10-90% of visible or IR light over a band of at least 100 nm width or a band of over at least 200 nm width or a band of at least 300 nm width.

The second multilayer polymeric optical film 260 has a baseline optical repeating unit thickness profile 270 and a second apodized optical repeating unit thickness profile 280. The second apodized optical repeating unit thickness profile 280 defines the first side 261 of the second multilayer polymeric optical film 260. The first side 261 of the second multilayer polymeric optical film 260 is disposed on or in contact with the intermediate layer 250. The second apodized optical repeating unit thickness profile 280 monotonically deviates from the baseline optical repeating unit thickness profile 270. In some embodiments, the second apodized optical repeating unit thickness profile 280 monotonically and exponentially deviates from the baseline optical repeating unit thickness profile 270.

The baseline optical repeating unit thickness profile 270 is defined by a first plurality of optical repeating units having a first average slope. The second apodized thickness profile 280 of the multilayer polymeric optical film 260 is defined by a second plurality of optical repeating units that have a second average slope (defining at least a portion of the second plurality of optical repeating units) being at least 5 times greater than the first average slope. In many embodiments, the second average slope is at least 10 times greater than the first average slope. The second plurality of optical repeating units 280 are in a range from 3-15% or form 5-10% of the total number of optical repeating units, or may contain from 4 to 20 of the total number of optical repeating units forming the first multilayer polymeric optical film 260.

In some embodiments, another apodized optical repeating unit thickness profile 290 defines the second side 262 of the second multilayer polymeric optical film 260 and joins the baseline optical repeating unit thickness profile 270. This additional apodized optical repeating unit thickness profile 290 has from 3-15% or from 5-10% of the total number of optical repeating units, or may contain from 4 to 20 of the total number of optical repeating units that form the second multilayer polymeric optical film 260. The other apodized optical repeating unit thickness profile 290 monotonically deviates from the baseline optical repeating unit thickness profile 270. In some embodiments, the other apodized optical repeating unit thickness profile 290 monotonically and exponentially deviates from the baseline optical repeating unit thickness profile 270.

In many embodiments, the first apodized optical repeating unit thickness profile 240 overlaps the second baseline optical repeating unit thickness profile 270. Likewise, the second apodized optical repeating unit thickness profile 280 can overlap the first baseline optical repeating unit thickness profile 220. In many embodiments, the first baseline optical repeating unit thickness profile 220 does not overlap the second baseline optical repeating unit thickness profile 270.

In many embodiments, the first baseline optical repeating unit thickness profile 220 thickest optical repeating unit has a thickness value that is within 15% or within 10% or within 5% of a thinnest optical repeating unit of the second baseline optical repeating unit thickness profile 270. In many embodiments, the thickest optical repeating unit of the first baseline optical repeating unit thickness profile 220 is adjacent to the second side 212 of the first multilayer polymeric optical film 210 and the thinnest optical repeating unit of the second baseline optical repeating unit thickness profile 270 is adjacent to the first side 261 of the second multilayer polymeric optical film 260. The first multilayer polymeric optical film 210 and a second multilayer polymeric optical film 260 can be formed of the same material sets or different material sets, as described below.

At least one difference between vacuum deposited stack designs and coextruded polymeric multilayer stack designs is the shape of the layer profile distribution. With vacuum deposited films, the desired spectrum is achieved by individually adjusting the thickness of every layer in the stack so it conforms to a computer optimized stack design. In this manner, issues such as spectral ripple are routinely minimized. Adjacent layers sometimes differ in thickness by a factor of 10, with thickness values often ranging from about 0.05λ to 1.0λ. With coextruded polymeric film stacks, on-line monitoring and control of individual layers in this manner is not yet a viable option with this technology. As a result, spectral shape is controlled mainly by the shape of a continuous and smoothly varying layer thickness profile, such as profile 5a in FIG. 5. Such profiles are not restricted to polymeric film stacks, and the apodizing profiles disclosed herein can be applied to any stack that utilizes layer thickness profiles that are graded from thin to thick layers in a substantially monotonic fashion.

One should also note that the classic examples of apodized stacks are not broadband reflectors but are stacks that are centered, i.e., tuned, for one (i.e., a single) wavelength. For those stacks, there is no "in-band" ripple, only side-band ripple. In such a stack, all ORUs have substantially the same thickness value. Furthermore, the apodization profile for those stacks generally extends through much or sometimes all of the layers of the stack and typically use profiles of index change, not profiles of thickness change. Common examples can be found in the fiber optic industry where the "stack" is a modulated index profile along the length of the fiber. Some apodization profiles are Cosine, Guassian, Quintic, Septic or Sinc function index profiles, for example.

By broadband reflectors we mean reflectors for which the longest and shortest wavelength in the reflection band have a wavelength ratio of about 2:1 or more, although generally they can be as low as 1.5:1 and up to as large as 5:1 for polymeric reflectors. In the following, non-limiting examples are presented, that describe various embodiments of the articles and methods discussed herein.

Some product constructions may require 500 or more ¼ wave thick optical layers. Extrusion hardware is generally not available to fabricate such stacks with no intermediate thick optical layers, and lamination of two or more stacks in a manner so as to provide a continuous a/b/a/b ¼ wave thick layer profile is difficult. In general, the combination of two sets of Optical Repeating Units (ORUs) results in the unavoidable inclusion of a thick intermediate layer, as illustrated in FIG. 5.

Figure 5:
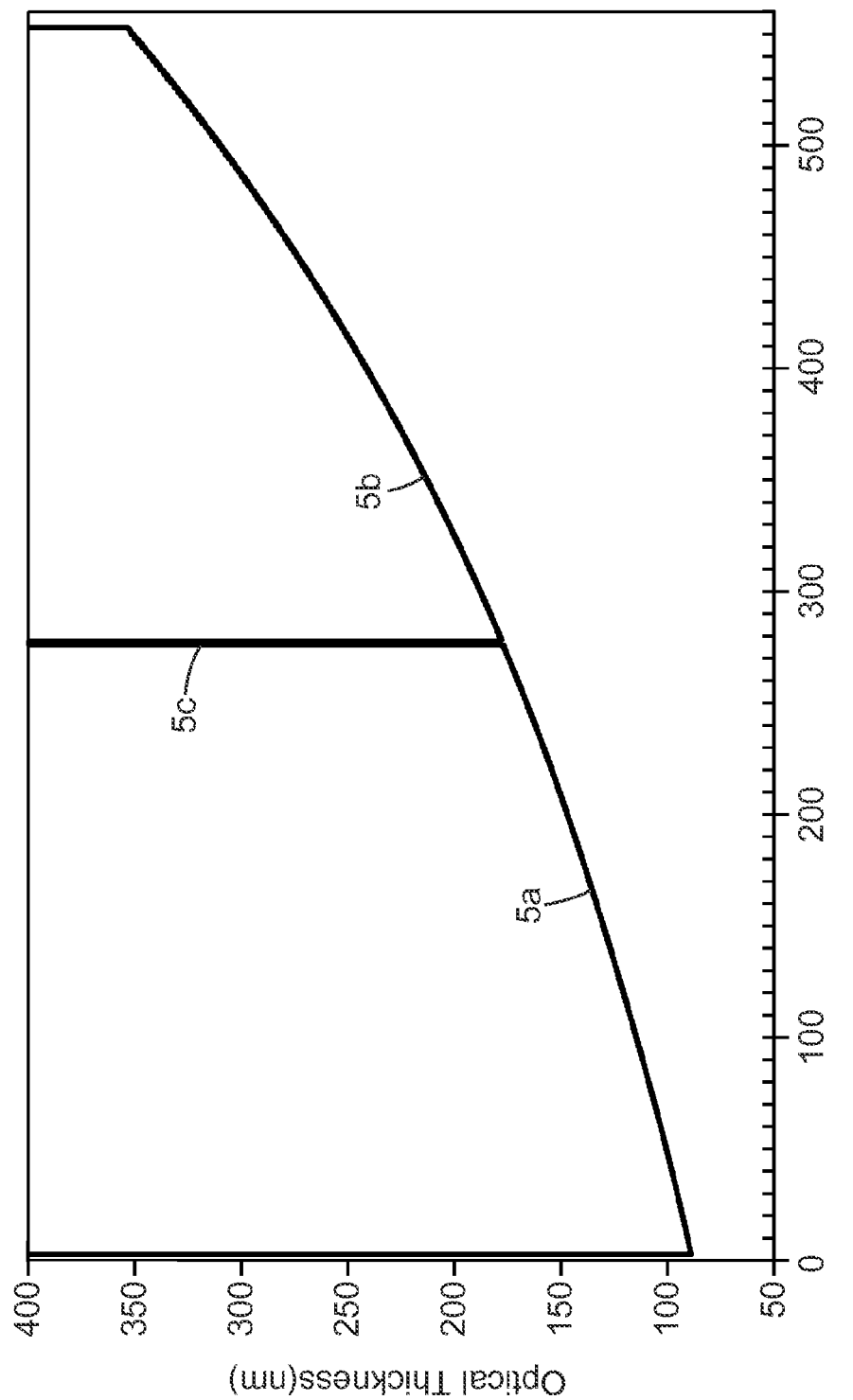
FIG. 5 is a layer profile thickness graph of a optical film having two optical packets.

FIG. 5 presents two sets of similar layer thickness profiles of 275 layers each that are joined with an intermediate optically thick layer such as an adhesive or other polymeric layer. Layer thickness profiles 5a and 5b consist of 275 layers each and are optically coupled with an intermediate optically thick layer 5c such as a clear adhesive or other layer, including an air gap. The profiles for each set are based on a simple power law profile for each layer n, from n=1 to N, where the thickness t of each layer is given by t=$T_0$*(1.005)^n where $T_0$ is a constant scaling factor and n is the layer number. Since the layer thickness values for the high and low index materials are not the same, the profiles of the optical thickness values are plotted here. The layer profile shown here is modified with a small adjustment that slightly increases the curvature to help adjust for index dispersion. These layer thickness profiles will yield the spectra 6a and 6b in FIG. 6 for the pass and block axis of the film respectively. The optical thickness values of the layers are shown in FIG. 5 instead of the physical thickness. The modeling was performed using ¼ wave optical thickness for each layer, meaning the physical thickness values are adjusted for the differing index values of the high and low index materials.

Figure 6:
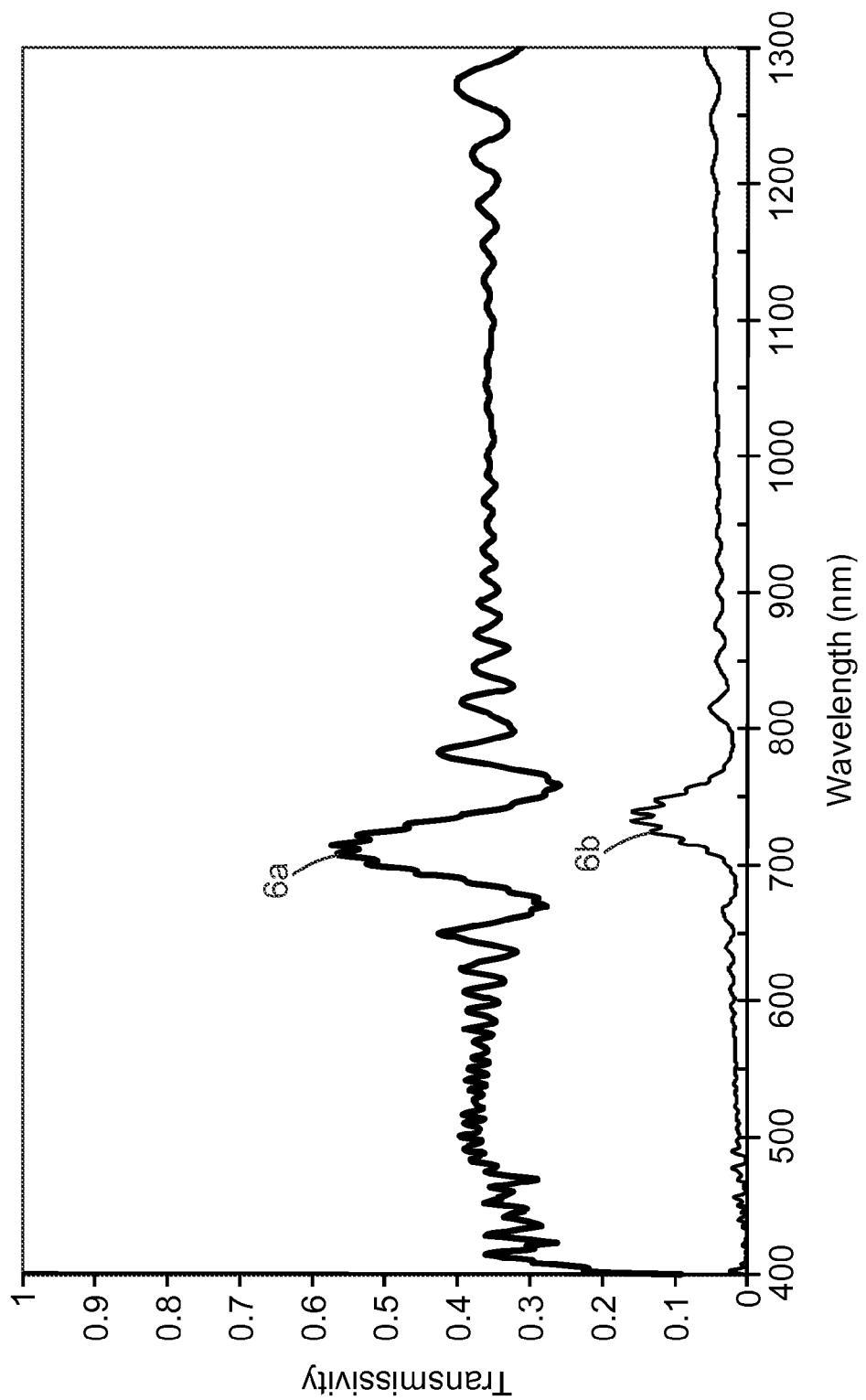
FIG. 6 is a graph of the spectra resulting from the layer thickness profile of FIG. 5.

The modeled spectra of FIG. 6 are based on the indices of a birefringent film stack that has the following indices of refraction: high index layers were $nx1=1.791$, $ny=1.675$, $nz=1.490$, and low index layers where $nx2=ny2=nz2=1.564$. This stack also includes 20 micrometer thick skin layers of the low index material. The birefringent layer index set can be achieved with an asymmetrical orientation of a coPEN copolymer (90% naphthalate units, 10% terephthalate units). The low index is that of PETg GN071, which is available from Eastman Chemicals, Kingsport, Tenn. All indices are those measured at 633 nm using a Metricon Instrument, Princeton N.J.

As can be seen in FIG. 6, the optically thick layer causes a significant spectral disruption that is apparent near 700 nm. If the stack were continuous, the spectra would be smooth and undisturbed at the juncture of the two "stacks". The ratio of the thicknesses of the two stacks that provide the spectra in FIG. 6 is 1.98:1. This ratio, sometimes referred to as the multiplication ratio, can be adjusted to provide more or less overlap of the spectra. However, with a little modeling, it is readily shown that a substantial disruption is always present in the spectrum. A solution to this problem is to combine apodized versions of the two individual stacks, as shown in the following Examples.

EXAMPLES

Example 1

Computer Modeled Layer Profiles and Spectra

Figure 7:
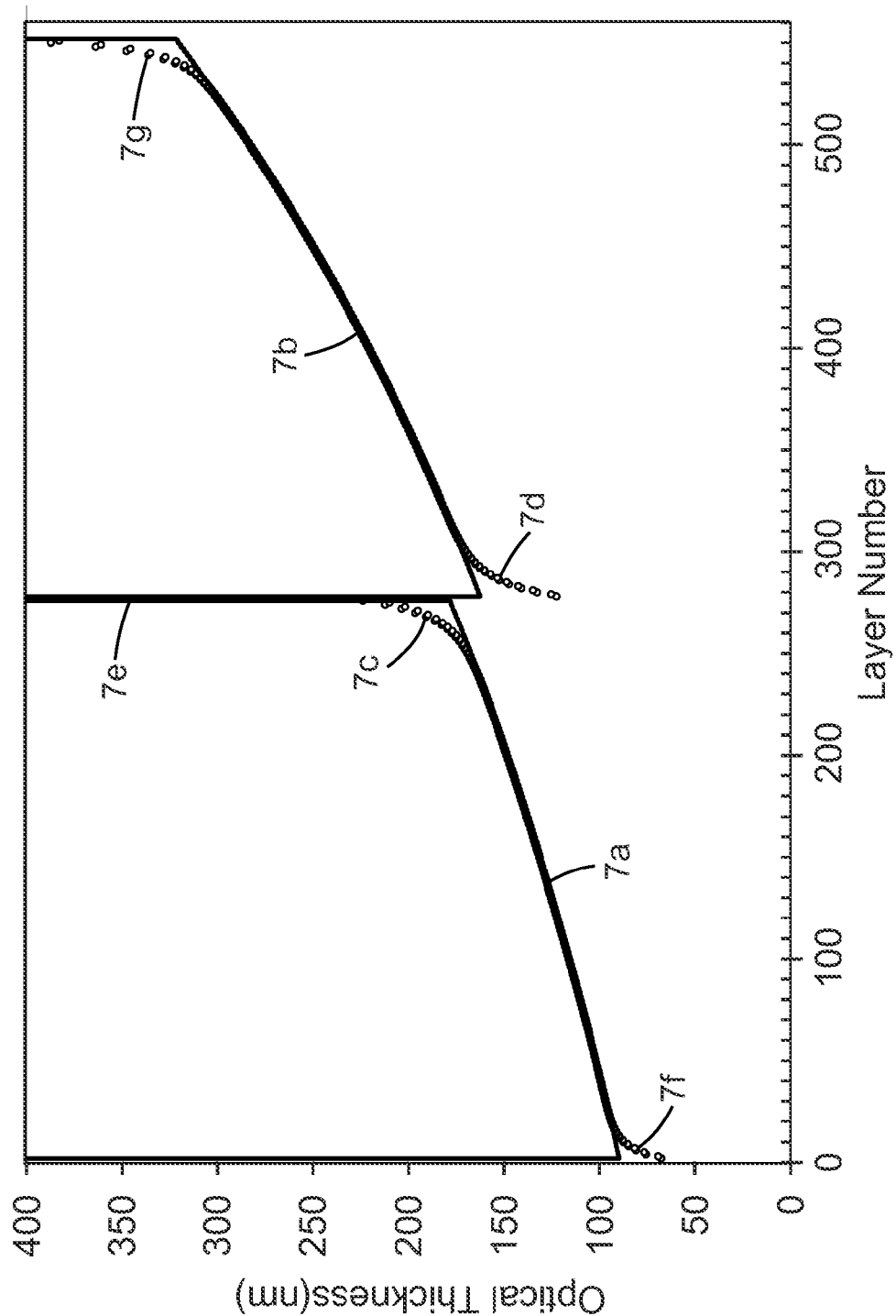
FIG. 7 is a layer profile thickness graph of an optical film having two apodized optical packets of Example 1.

An apodized version of the combined film stacks of FIG. 5 is illustrated in FIG. 7. This apodized version had the adjacent end sections of the two baseline profiles 7a and 7b replaced with apodizing profiles 7c and 7d, both of which terminated with a high positive slope at the intermediate layer 7e. In addition, the outer ends of the stacks on each outside surface were apodized with profiles 7f and 7g. The outer end apodization is optional, and can be applied to either side, or one side or both sides, as desired. Each stack in this calculation had a skin layer of 20 micrometers on each surface of the stack. A full description of apodizing profiles is disclosed in co-pending U.S. patent application Ser. No. 61/549,600, titled "Apodized Broadband Partial Reflectors").

The apodized profile for each end of the stacks of FIG. 7 was an exponential thickness profile given by t=A*Exp(−n/d) where n is the layer number (from a given end), A is a fractional amplitude, and d is a scalar (the 1/e value) that is a measure of how far the apodization profile extends into a stack from a given side of a stack. These values were added to the baseline layer values. $A_1$ for layer number 1 was −0.25 and $A_{275}$ for the thick layer end was +0.25 for each stack 7a and 7b. In other words, layer 1 of the apodized profile was 25% thinner than layer 1 of the baseline profile for layer 1 and layer 275 was 25% thicker than layer 275 of the baseline profile, for each stack. The values for d=1/e were set to 7.5 for each end of each stack. For the exponential formula, the layers were numbered in pairs, i.e., the layer number n=0 was used for each layer of the first ORU, n=1 for each layer of the $2^{nd}$ ORU, n=2 for each layer of the $3^{rd}$ ORU and so on. In this manner, each optical repeating unit had an f-ratio of about 0.5. The alternative counting scheme wherein each layer receives a unique number n was found to make very little difference in the calculated spectra.

An important part of this design was the adjustment of the baseline profile 7b to be thinner than its analogous profile 5b in FIG. 5. In general, minimum spectral disruption was found to occur in modeled results when the thickness of baseline profile 7b was adjusted relative to profile 7a so that the two points where the apodizing profiles 7c and 7d each asymptotically join their respective baseline profiles were at about the same thickness values. This was not an exact equality as the adjustment level was found to depend slightly on the shape and depth of the two apodizing profiles 7c and 7d, and on the index differentials of the stacks. In general though, is was found that these two points should be chosen such that they differ in thickness by less than about 5% or less than about 10% of their average thickness value.

The apodizing profiles such as 7c and 7d were found to be useful for combining two films stacks such as 7a and 7b in order to create a combined stack that has a final spectrum that is substantially seamless with respect to disruptions in the spectrum. In other words, the purpose of these interior apodized profiles is to create a combined stack that has a transmission/reflection spectrum that is similar to that of a stack made with a single continuously graded layer profile. If desired though, it was found that the relative thickness values of the two film stacks can be adjusted to provide for a local minimum or local maximum in the overlap region of the reflection spectrum of the combined stacks.

Spectra were generated for profiles such as these using optics computer models known to those skilled in the art. In order to provide a better understanding of the optics of the combined apodized stacks, the individual spectra of the two layer profiles "7a+7c+7f" and "7b+7d+7g" were calculated and then plotted together in FIG. 8. The "apodized" profiles yield the individual spectra 8a, 8b, 8c and 8d of FIG. 8 for the pass and block axes of each stack. Spectra 8a and 8b were the results produced by the thin stack and spectra 8c and 8d were the results produced by the thick stack. The sloped bandedges of the individual packet spectra were found to play an important role in providing for a smooth combined spectrum when the two stacks were optically coupled, which can be done in actual practice either by coextrusion or by lamination after extrusion and orientation (i.e., stretching). It was found that the slopes of the bandedges were determined mainly by the apodizing profile that is added to the end of the baseline profile. The bandedge slope can thus be adjusted by changing the amplitude, shape and depth of the apodizing profile on that end of the stack.

Figure 8:
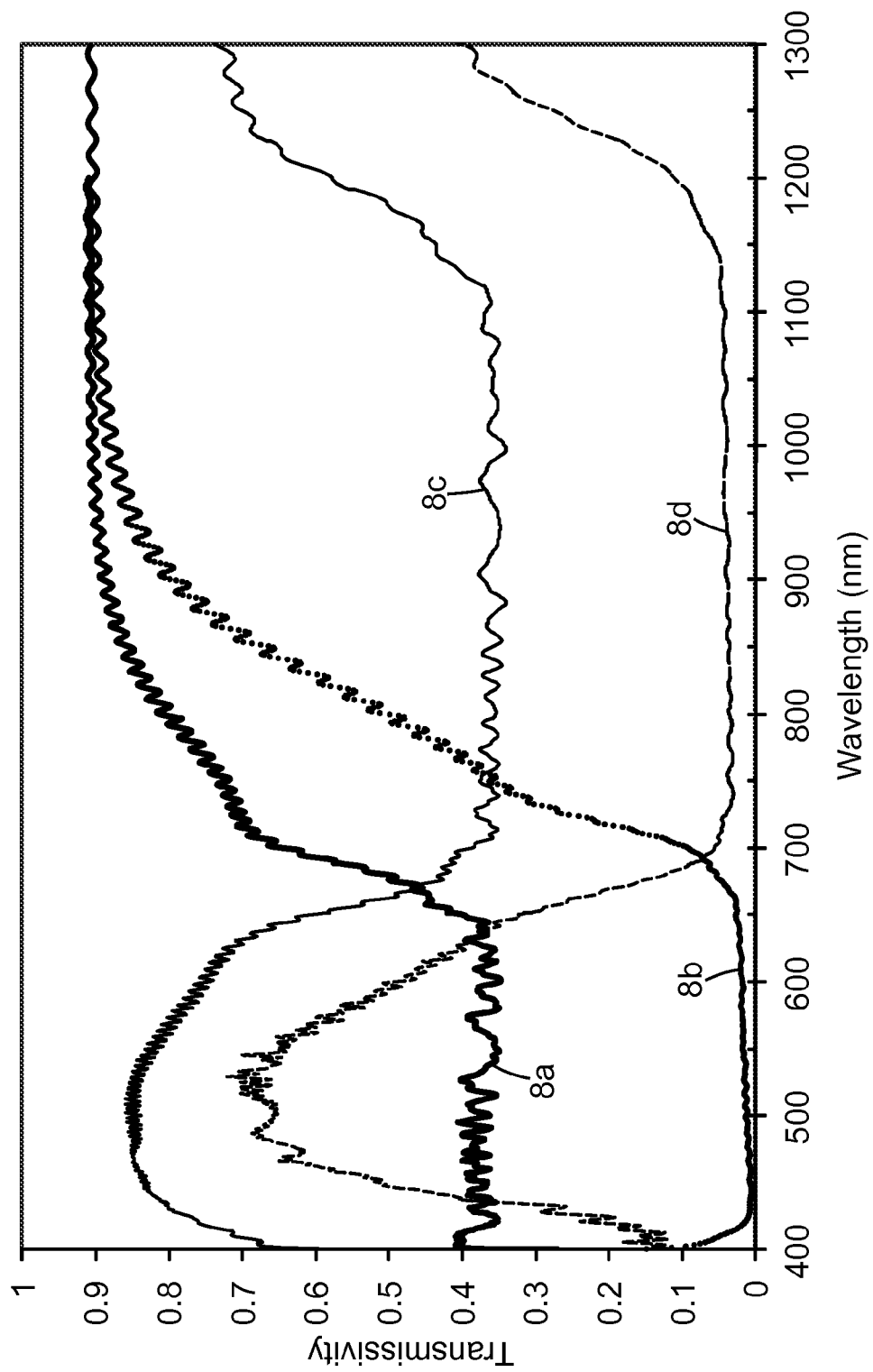
FIG. 8 is a graph of the spectra resulting from the layer thickness profile of FIG. 7.

The slopes of the overlapping bandedges of pass axis spectra 8a and 8c, as well as the slopes of overlapping bandedges of the block axis spectra 8b and 8d were calculated from the modeled transmission data plotted in FIG. 8. The portion of each bandedge near the baseline that overlaps the adjacent spectrum was chosen as the appropriate portions of the bandedge from which to calculate the slopes. The points chosen and the calculated slopes are listed in Table 1. The absolute values of all four of the measured slopes were approximately 0.5% per nm. Slopes were also determined in two physically performed experimental examples below and all bandedges exhibited slopes (absolute values) less than 1% per nm. A range of bandedge slopes of from 0.25 to 1.0% per nm was thus found to be useful for achieving a smooth spectrum of the combined stacks.

TABLE 1

| Spectra | point 1 | point 2 | slope (%/nm) |
|---------|---------|---------|--------------|
| 8a | 650 nm, 40% T | 700 nm, 66.4% T | 0.53 |
| 8b | 640 nm, 65.6% T | 700 nm, 39.6% T | −0.43 |
| 8c | 690 nm, 7.1% T | 740 nm, 33.7% T | 0.53 |
| 8d | 645 nm, 35% T | 700 nm, 5.5% T | −0.54 |

Figure 9:
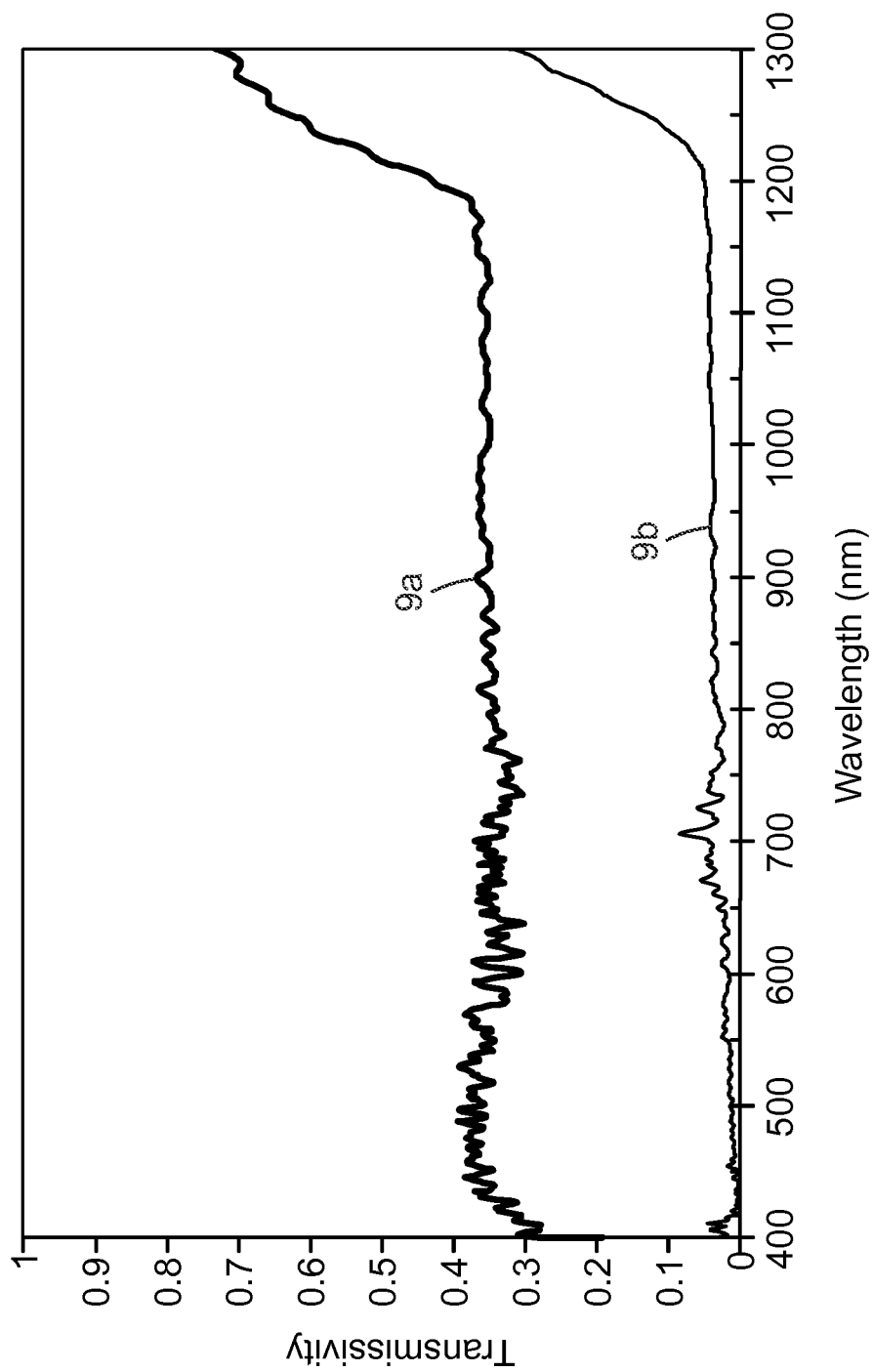
FIG. 9 is a is a graph of the spectra resulting from the layer thickness profile of FIG. 7 with a thicker intermediate layer.

It was found that the amount of overlap of the two adjoining spectra, for either pass or block axis, could be adjusted to provide for the desired shape of the final spectrum of the combined stack. In the case of the profiles 7a and 7b, each layer n from 1 to 275 of profile 7b was the same multiple of each corresponding layer in profile 7a. The "multiplication ratio" of the stacks used to calculate the spectra in FIG. 8 was 1.75. It was found that this ratio could be adjusted so as to provide the desired degree of spectral overlap of the individual packets, thus providing for the most uniform spectrum for the combined film stack. Using a multiplication ratio of 1.80, the spectra 9a and 9b of the combined apodized stacks, assuming a 20 micrometer thick protective boundary layer (i.e., PBL) between the stacks, were calculated and are plotted in FIG. 9. The thick PBL considered here is analogous to intermediate layer 7e in FIG. 7. Compared to the spectra in FIG. 6, the spectral disruption near 700 nm was greatly reduced in FIG. 9.

For this particular Example, the thick end of profile 7a can be said to end at about layer #248 which had a thickness of about 167 nm and profile 7b can be said to begin at about layer #304 which had a thickness of about 173 nm. These two points have thickness values that differ by −3.5%. This difference can be called the thickness overlap of the two stacks and the negative sign in this example refers to the fact that the baseline profiles did not quite overlap.

In general, the two baseline films stacks 7a and 7b are not exact multiples of one another, and one can have a very different shape than the other, as illustrated by the examples below. The multiplication ratio is best described as the ratio of the total optical thickness of one baseline stack compared to the total optical thickness of the other baseline stack. If one stack has a different thickness profile shape than the other, the amount of overlap may be desirably larger than the example here. In general, the thickness overlap can be +/−5% or +/−10%, or even +/−20% for highly sloped or curved spectra.

This percent difference can be varied, along with the details of the exact shape of the two apodizing profiles, to create the desired spectral shape of the combined stack. The depth of the apodizing profiles can be varied in order to provide the optimum bandedge slopes of the adjoining spectra.

Although this Example used exponential tail distributions on the ends of a standard power law layer distribution, an apodization profile of one, two, or more straight line or slightly curved line segments or other shapes have also been found effective for combining stacks with reduced spectral distortions.

Effect of Intermediate Thick Layers

Figure 10:
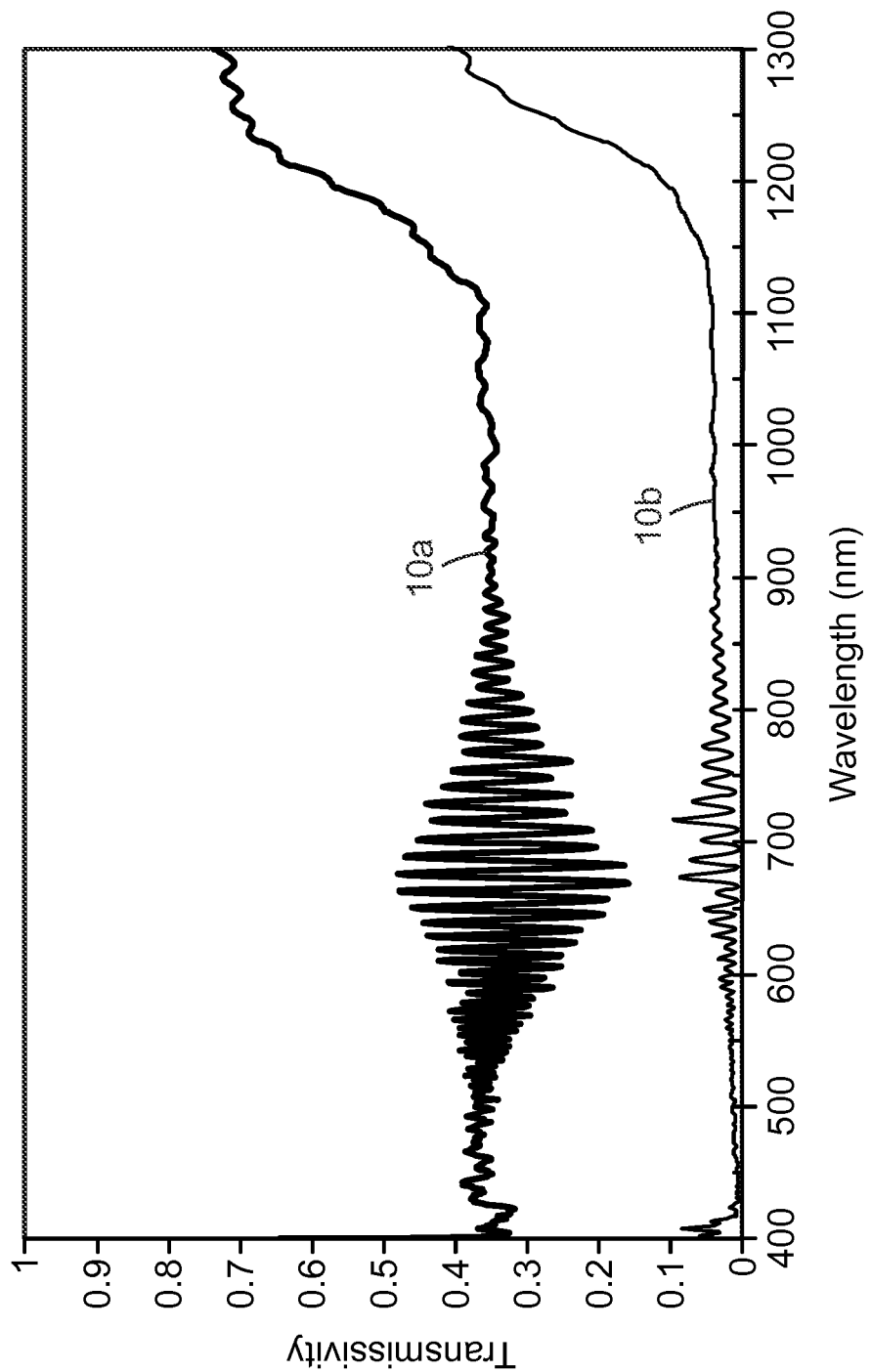
FIG. 10 is a is a is a graph of the spectra resulting from the layer thickness profile of FIG. 7 with a thinner intermediate layer.

The optically thick layer of the above Example was 20 micrometers thick. If this layer was made thinner, it was found that a high frequency oscillation would begin to appear in the spectra, as illustrated in FIG. 10 by spectra 10a and 10b for the pass and block axes of the combined stacks, for a layer of 5 micrometers thickness between the stacks. In system applications which employ broadband light sources, or even LEDs, the spectra of FIG. 10 would generally be acceptable because the light source spectrum has features that are much broader than the ≈12 nm maximum peak to peak spacing of the ringing here.

One surprising advantage of combing stacks with apodizing profiles, which was found by the modeling, was that the intermediate thick optical layer could be any thickness, including zero or ½ lambda or any multiple of ½ lambda, and the spectral features so obtained remained similar to those of FIG. 10. This is quite unusual because ½ lambda values are generally avoided in multilayer stack designs that require a flat or slowly changing spectrum. The term "slowly changing" is used here to include the spectrum of FIG. 10, in spite of the high frequency oscillations since a broadband light source will easily average such variations. Even with a zero thickness value for layer 7e, the high frequency ringing evident in FIG. 10 was broadened to a maximum spectral separation (peak to peak lambda separation) of only 25 nm.

Example 2

Laminated Polymeric Film

Multilayer polymer stacks of 275 layers were generated with apodization profiles by coextrusion of 90/10 coPEN (90% naphthalate units and 10% terephthalate units) and PETg. The target apodized layer profiles were similar to those of FIG. 7. Using the feedblock method described in U.S. Pat. No. 6,783,349, 275 layers total of alternating low and high index polymer layers were coextruded as a cast web and then biaxially oriented on a sequential film making line. The length orienter stretch ratio was 3:1 and the tenter stretch ratio was about 6:1. The asymmetric orientation was used so as to produce a polarizing reflector. The high index birefringent material was the 90/10 coPEN.

The stretching (i.e., orientation) temperatures and rates were adjusted so as to obtain the following set of indices for the birefringent high index 90/10 coPEN polymer: $nx \approx 1.80$, $ny \approx 1.67$, $nz \approx 1.48$. The low index isotropic material was PETg, available from Eastman Chemical, which had an index of about 1.564. All indices were measured at 633 nm. A thin film stack and a thick film stack were cast and stretched so as to provide film samples for lamination to demonstrate a smooth spectrum via the overlapping of the two apodized stack spectra.

Figure 11:
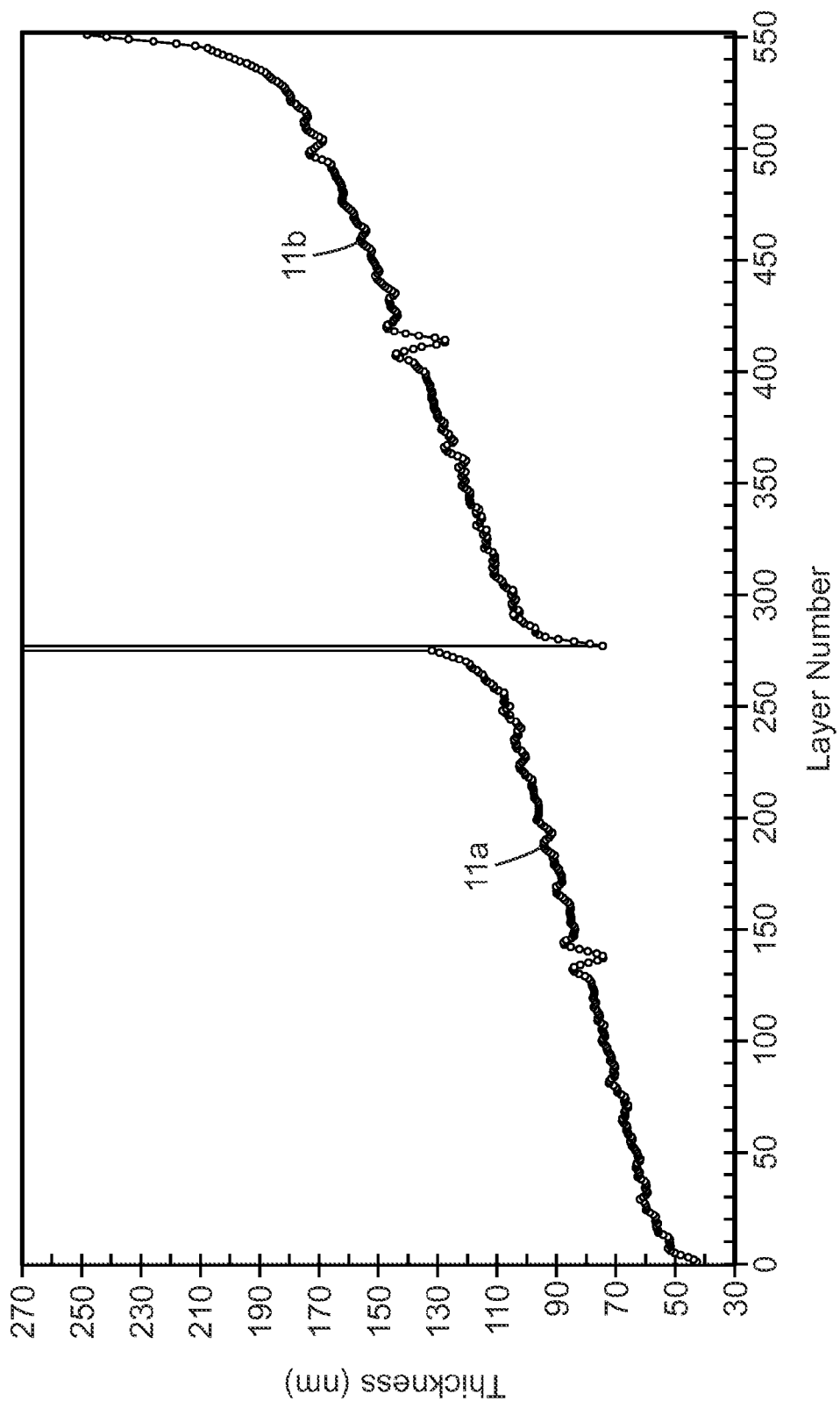
FIG. 11 is a layer profile thickness graph of an optical film having two apodized optical packets of Example 2.

The apodization profile was successfully achieved on each end of the stacks, but layer disruptions in the centers of the stacks resulted in a rather non-uniform spectra. The layer profiles 11a and 11b of the two packets are plotted in FIG. 11.

Figure 12:
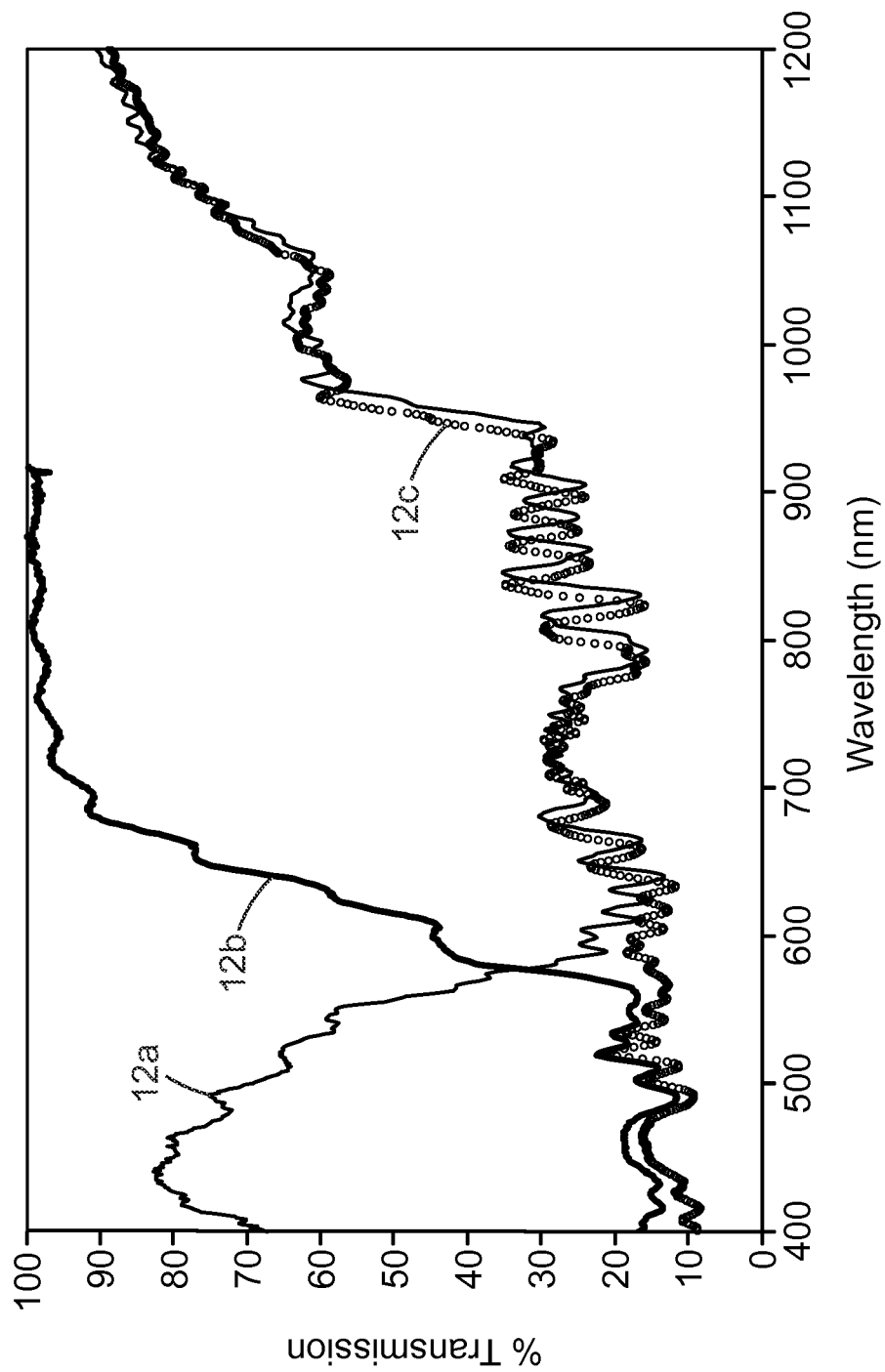
FIG. 12 is a graph of the spectra resulting from the layer thickness profile of FIG. 11.

The spectra of the thin and the thick film stacks 11a and 11b, and of the combined film after lamination, are shown in FIG. 12. The corresponding spectra 12a and 12b were measured for the pass axis of each film at 60 degrees incidence angle for p-polarized light. The two films were laminated with a 50 micrometer thick clear optical adhesive and the laminate yielded the combined spectrum 12c. From the spectra, one can see that the basic apodized spectral profile was achieved for each packet in spite of the large layer disruptions in the center of each stack. The spectrum of the laminate exhibited a smooth transition through the overlap wavelength range near 580 nm with no exceptional oscillations or deviations from a continuous spectrum that is desirable from such a combination.

The significant spectral disruption in the center of each packet spectrum caused a problem with the attainment of a smooth spectrum. The intrinsic bandwidth relationship, discussed below, provides insight into the necessary limits of local disruptions in the layer profile and to the required magnitude of the apodization profile. The slopes of the adjacent bandedges in the laminated stack were +0.66%/nm and −0.9%/nm for packets 1 and 2 respectively. These values were calculated from the points (18% at 565 nm, 77.5% at 660 nm) and (57.6% at 550 nm, 21.5% at 590 nm).

Intrinsic Bandwidth

The deviation of a layer thickness profile from design baseline layer profile can also be expressed in terms of an optical coherence length that is known as the intrinsic bandwidth (IBW). The intrinsic bandwidth is a measure of the strength of coherence of adjacent layers in terms of constructive interference leading to reflectivity:

$$IBW = 4/\pi * [(n1-n2)/(n1+n2)].$$

More generally for any polarization or angle of incidence:

$$IBW = 4/\pi * r$$

where r is the Fresnel reflection coefficient for the interface between the material layer pairs. The expression [(n1−n2)/(n1+n2)] is recognizable as the value of r for light at normal incidence on a stack of alternating layers of index n1 and n2 where n1>n2.

The IBW is a fractional bandwidth $\Delta\lambda/\lambda_0$ where $$IBW = \Delta\lambda/\lambda_0 = 4/\pi * r.$$

Since layer thickness is directly proportional to the center wavelength of reflection via the familiar relationship between wavelength λ and layer thickness d at normal incidence of ¼λ=nd, we can also write:

$$\Delta d/d_0 = IBW \text{ or } \Delta d/d_0 = 4/\pi * r$$

In this manner one can determine the approximate range of contiguous layers in a graded stack that are working in a substantially coherent manner to reflect a given wavelength $\lambda_o$ that is associated with a layer of thickness $d_o$. For a film stack with a monotonically increasing or decreasing layer profile, the layers that are strongly coupled to any given layer are those on both sides of that layer within a thickness range of +/−Δd, where Δd is given by the above formula. The extent of undesirable consequences of localized disruptions of a smooth design layer profile can be gauged from the magnitude of the disruption in terms of the layer errors in units of the intrinsic bandwidth. The +/−8% value of the local layer deviations of the layer profile in FIG. 11 near layers #139 and #414 were much greater than 1 intrinsic bandwidth. At 60 degrees for p-polarized light, the Fresnel reflection coefficient for the pass axis of this stack can be calculated from ny1=1.675, ny2=1.564, nz1=1.48, nz2=1.564. These indices give a value of IBW=4/π*r=0.06 or 6%. The +/−8% profile disruption causes the rather significant disruption in the center of the spectrum of each stack, shown in FIG. 12. Such local thickness deviations are preferably less than a fraction of 1 intrinsic bandwidth, such as <0.5 intrinsic bandwidth or preferably <0.25 intrinsic bandwidth.

Combined Stacks with Sloped Spectra

The following three Examples include broadband partial reflecting films with sloped spectra that are useful in LCD displays as disclosed in co-pending U.S. application Ser. No. 61/549,588. An indication of the potential degree of collimation of light from a recycling backlight using these films can be obtained from the ratio of transmitted visible light at normal incidence and 60 degrees incidence of a given film. In most LCD TVs, the rear polarizer on the LCD panel is aligned with its pass axis in the horizontal direction. Thus the plane of incidence of p-polarized pass axis light is along the horizontal direction (left and right). The plane of incidence of s-polarized pass axis light is therefore in the vertical direction. Thus it is the backlight emission of s-polarized light that determines the brightness of the LCD panel when viewed from above or below the centerline and the backlight emission of p-polarized light that determines the viewing brightness from the left or the right. For this reason, the pass axis spectra of the three film examples are shown for s-polarized and for p-polarized light at 60 degrees and at normal incidence. The individual spectra for each packet of a film are also plotted to show the differences between packets with respect to their change in transmission with angle of incidence. All of the examples have only two packets with a different material set. However, three or more material sets could be employed if desired. If the interlayer adhesion of the layered stacks is so great that the layer packets cannot be peeled apart, the spectra of individual packets can also be calculated using the layer profile that is measured for the film stack.

These film Examples were 2 packet films with sloped spectra that have different material sets in each of the packets. All three exemplary films were constructed with a highly birefringent 90:10 coPEN as the high index polymer in each packet. coPENs are described in U.S. Pat. No. 6,352,761.

The following three Examples differed materially by the sets of low index polymer in each packet. Another important feature of these films was that the reflectivity vs. angle for packet 1 was very different than the reflectivity vs. angle for packet 2. In addition, the shape of the spectrum for each packet differed in each Example.

For all three Examples, the multilayer cast web was transversely stretched in a tenter with a stretch ratio of about 6 to 1. The stretch temperature and rate were adjusted so as to obtain the following set of indices for the birefringent high index 90/10 coPEN polymer: nx≈1.81, ny≈1.625, nz≈1.49.

In the three Examples below, various spectra from each of the films are presented. In addition, the two packets of each of the film specimens were peeled apart so the spectra of each packet could be measured separately. As was discussed in co-pending U.S. application Ser. No. 61/549,600, the apodization is most effective when skins layers are present on the film stacks. When a film is peeled apart to enable the individual measurements of each of packets 1 and 2, only a 5 micrometer extrusion protective boundary layer (PBL) is present on one packet, with no PBL present on the other packet. To measure the effectiveness of the apodization on individual film packets, a 50 micrometer thick layer of clear optical adhesive was applied to the inside surface of each packet immediately after peeling the two apart. After measuring the spectra, the two packets were laminated back together using the adhesive that had already been applied. The resulting 100 micrometer thick adhesive layer eliminated the internal spectral ringing between the packets, resulting in a smoother spectrum for the total film. This latter feature however is not needed for films that are intended for use with broadband or medium bandwidth light sources, including LEDs. It may be necessary if laser sources must be reflected reliably.

Example 3

Coextruded Polymeric Film Stack

Using the feedblock method described in U.S. Patent Application 61/332,401 entitled "Feedblock for Manufacturing Multilayer Polymeric Films", filed May 7, 2010, two packets of 275 layers each of alternating low and high index polymer layers were coextruded as a cast web and then stretched in a tenter on a continuous film making line. As described above, the high index material was a 90/10 coPEN (90% naphthalate units and 10% terephthalate units). The low index material differed between packet 1 and packet 2 of the microlayers. The low index material for packet 1 was a blend of PETg (EASTAR GN071 copolyester from Eastman chemicals) and an amorphous 55/45 coPEN (55% naphthlate units and 45% terephthalate units). The blend ratio was adjusted so as to obtain an index of 1.589. The low index material for packet 2 was TRITAN FX150 copolyester from Eastman Chemical (Kingsport, Tenn.) and had a measured index of 1.554. All indices were measured at 633 nm.

Figure 13:
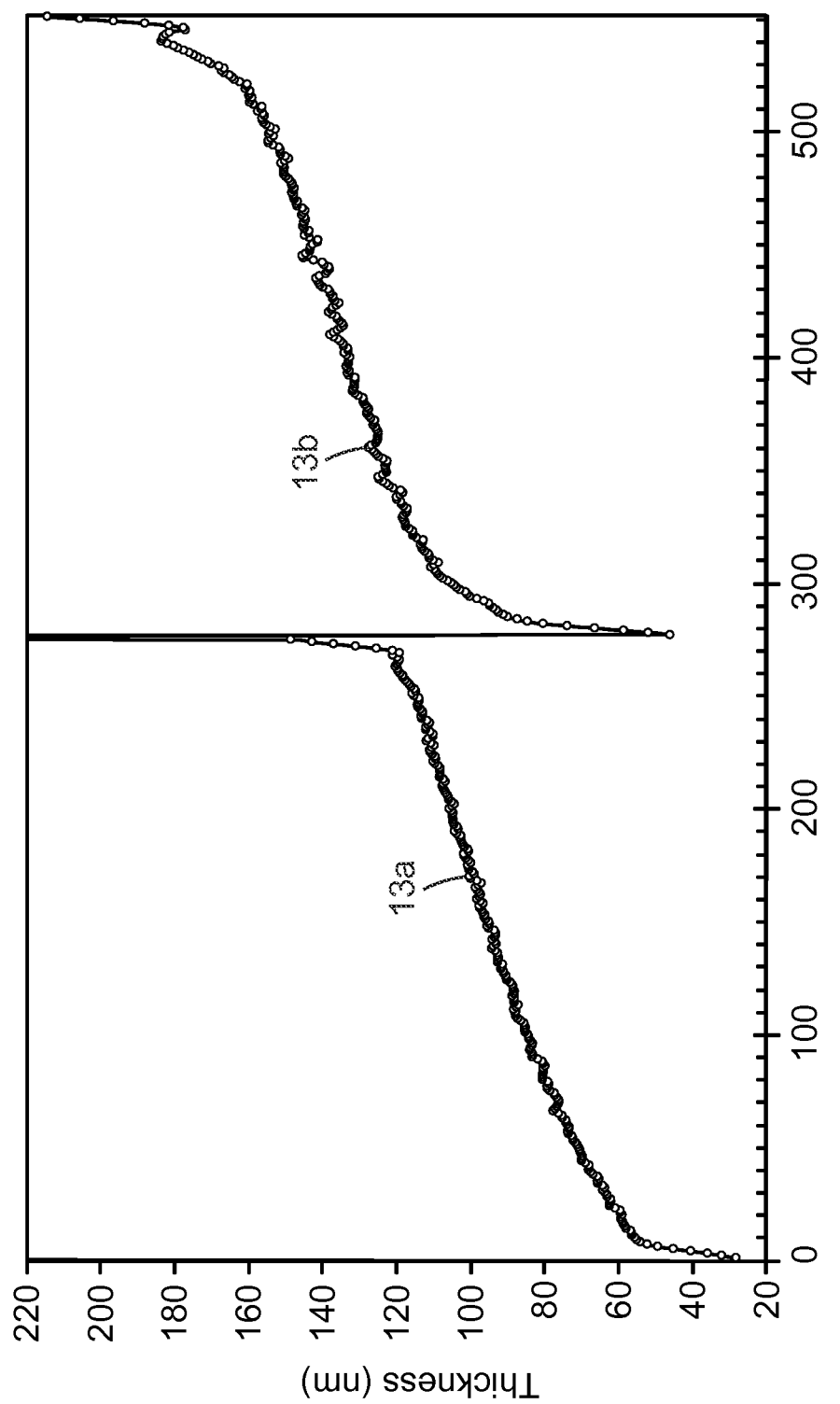
FIG. 13 is a layer profile thickness graph of an optical film having two apodized optical packets of Example 3.

The layer thickness values of the oriented film were measured using Atomic Force Microscopy (AFM), and the layer thickness profiles 13a and 13b are shown in FIG. 13 for packets 1 and 2 respectively.

Figure 14:
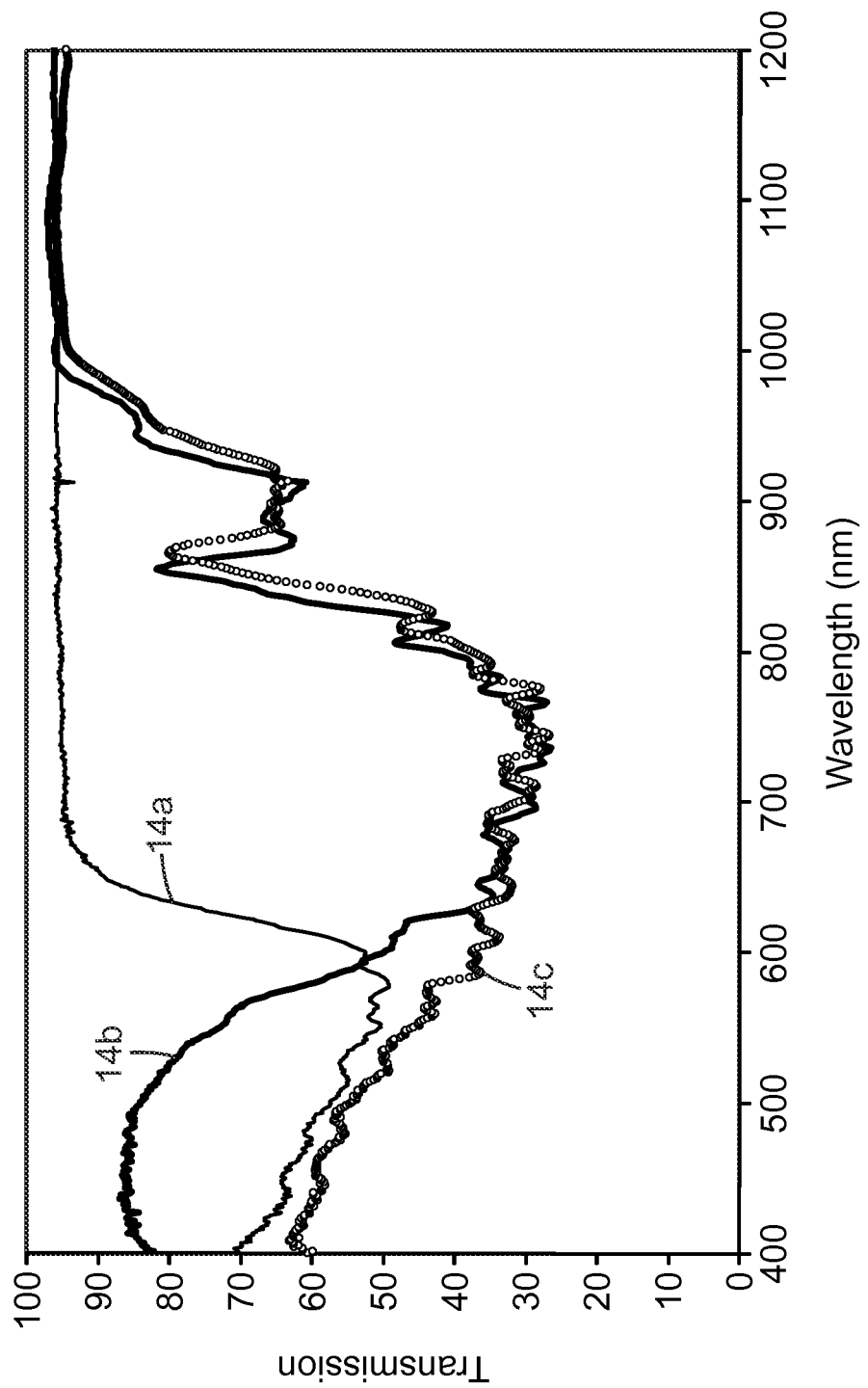
FIG. 14 is a graph of the spectra resulting from the layer thickness profile of FIG. 13.

The spectra 14a and 14b for each packet, and spectrum 14c for the laminated two-packet film, are shown in FIG. 14. These spectra were obtained with p-polarized light that was incident at 60 degrees on the film in the plane of the pass axis (y-axis) of this polarizing reflective film. Note the relatively smooth overlap of the two spectra near 600 nm in the resulting total film spectrum.

The slopes of the adjacent packet bandedges were 0.62%/nm and −0.51%/nm for packets 1 and 2 respectively. These values were calculated from the points (50.5% at 585, 84.7% at 640 nm) and (67.4% at 570 nm, 36.8% at 630 nm).

Also, note that the spectral transmission was higher for blue light than for red light. It is important though that the spectrum be relatively smooth, i.e. no large spectral oscillations, peaks or valleys in the visible spectrum from 0 to 90 degrees angle of incidence. The bandwidth of the spectrum 14c in FIG. 14 is wide enough such that the spectral disruption near 900 nm will not enter the visible spectrum, even if the film is immersed in a medium of index 1.2. These spectra were obtained at 60 degrees incidence angle, in air.

Figure 15:
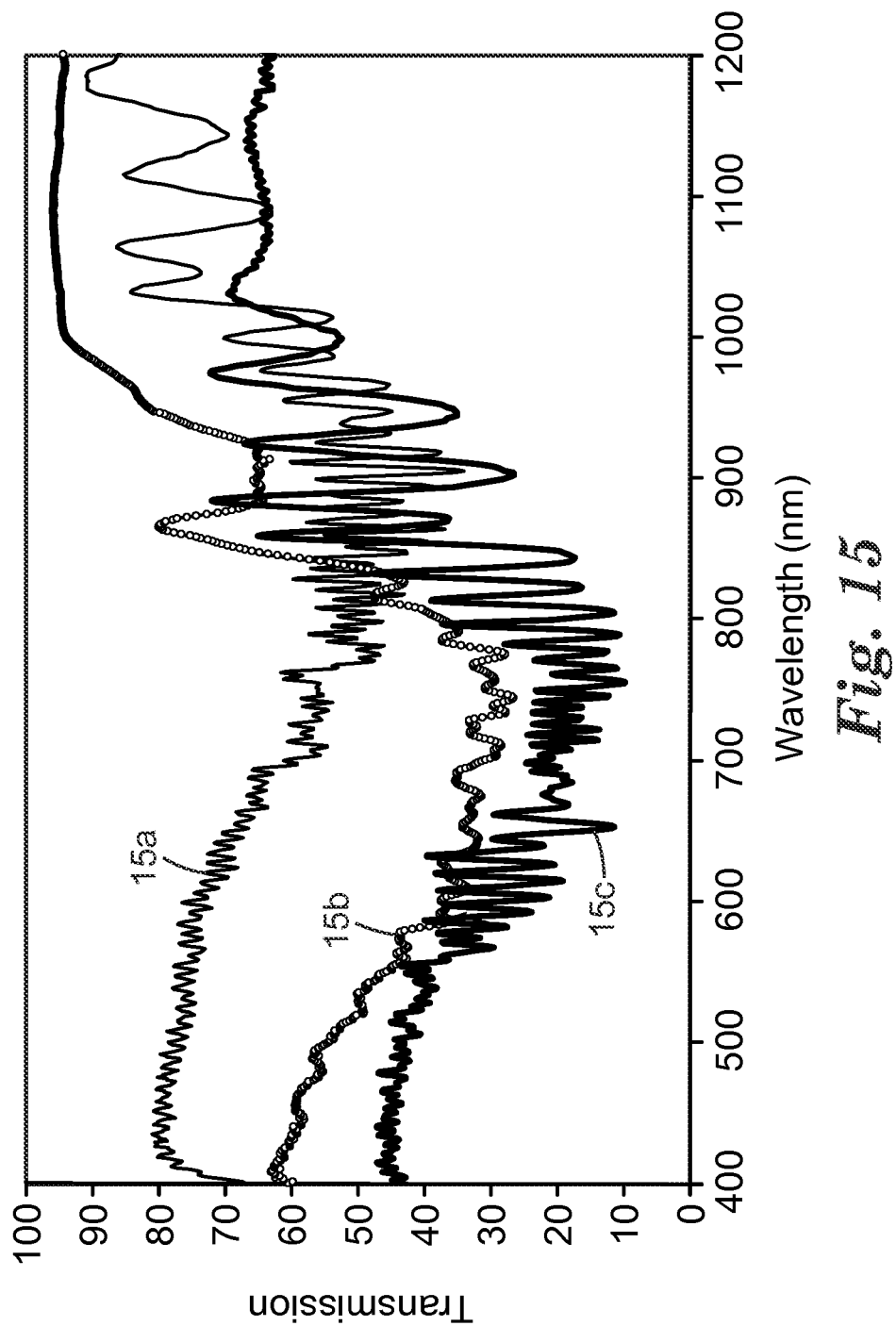
FIG. 15 is another graph of the spectra resulting from the layer thickness profile of FIG. 13.

As described above, the ratio of pass axis light transmitted at 60 degrees to the transmission value at 0 degrees is a good indication of the collimating potential of the film when used with a recycling backlight. The pass axis spectrum 15a for normal incidence light was plotted in FIG. 15. The transmission at 60 degrees for p-pol and s-pol light are given by spectra 15b and 15c respectively.

The average transmission values listed for each measurement (% T) were estimated by averaging the transmission values of each spectrum between 420 nm and 680 nm. No photopic weighting was used, although this could be applied if desired. The average % T values for this example were: for p-pol: 75% at 0 deg, dropping to 46% at 60 deg, and for s-pol: 75% dropping to 36% at 60 deg. The ratios of the values of $T_{60}/T_{00}$ for p-pol and s-pol light were 0.62 and 0.48 respectively.

Figure 16:
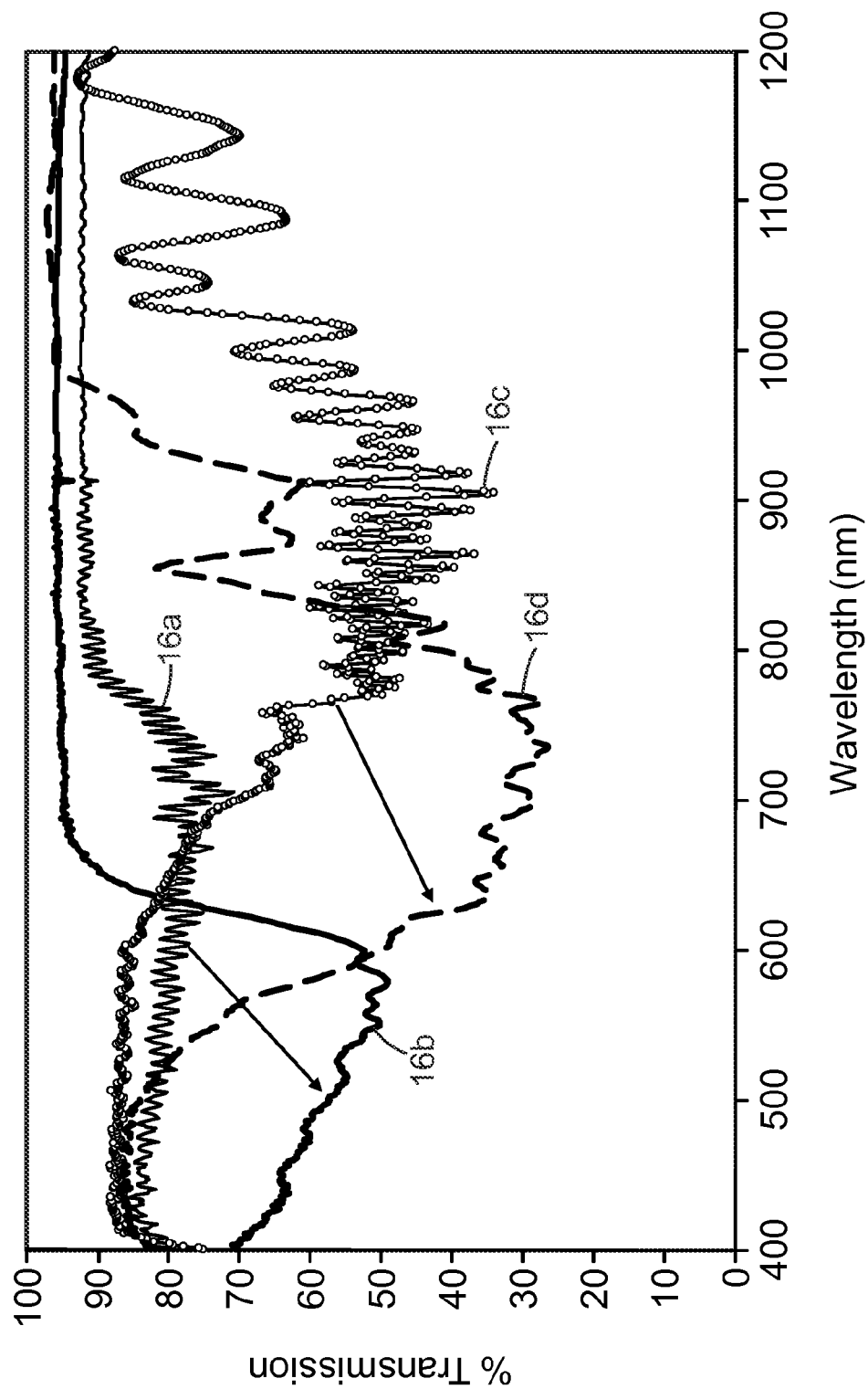
FIG. 16 is another graph of the spectra resulting from the layer thickness profile of FIG. 13.
Figure 17:
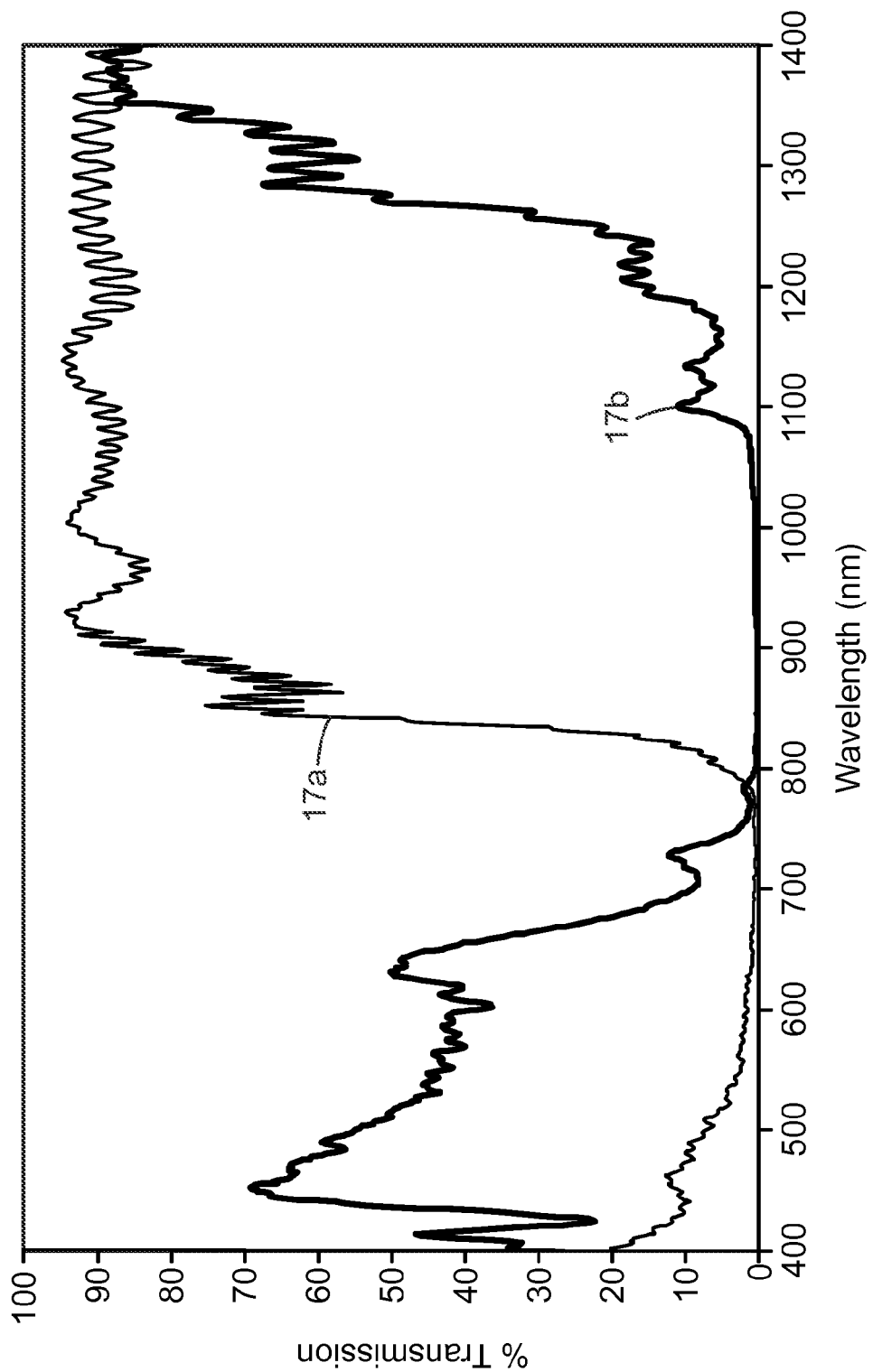
FIG. 17 is another graph of the spectra resulting from the layer thickness profile of FIG. 13.

The large slope of the spectrum requires very high transmission of light in the blue and good collimation of recycled blue light also requires that the reflectivity of packet 1 increases more rapidly with angle than does the reflectivity of packet 2 for this film design. The separate spectra 16a through 16d for 0 degrees and 60 degrees for p-polarized light for packets 1 and 2 were plotted in FIG. 16. The approximate increase in reflectivity at 60 degrees compared to normal incidence was about a factor of 3 (3×) for packet 1 and about 1.5× for packet 2. These values were obtained from the following estimated transmission values for the two packets:

$R0 \approx 12\%, R60 \approx 35\%, \Delta R \approx 3\times$   Packet 1:

$R0 \approx 40\%, R60 \approx 60\%, \Delta R \approx 1.5\times$   Packet 2:

The need for using different material sets for each of the two packets arose from the requirement of high transmission in the blue for the pass axis while simultaneously having low transmission in the blue for the block axis at normal incidence. The inventive films described herein accomplished this by decreasing the Δny index differential of packet 1 compared to packet 2. This was done via the material difference in the two packets. The block spectra 17a and 17b of packet 1 and packet 2 respectively were plotted in FIG. 17.

Example 4

Coextruded Polymeric Film Stack

Using the same method as for Example 3, two packets of 275 layers each of alternating low and high index polymer layers were coextruded as a cast web and then stretched in a tenter on a continuous film making line. The high index material was a 90/10 coPEN (90% naphthalate units to 10% terephthalate units). The low index material differed between packet 1 and packet 2 of the microlayers. The low index material for packet 1 was a 55/45 coPEN and having an isotropic index n=1.605. The low index material for packet 2 was NEOSTAR FN007 copolyester from Eastman Chemical and had a measured index of 1.505. All indices were measured at 633 nm.

Figure 18:
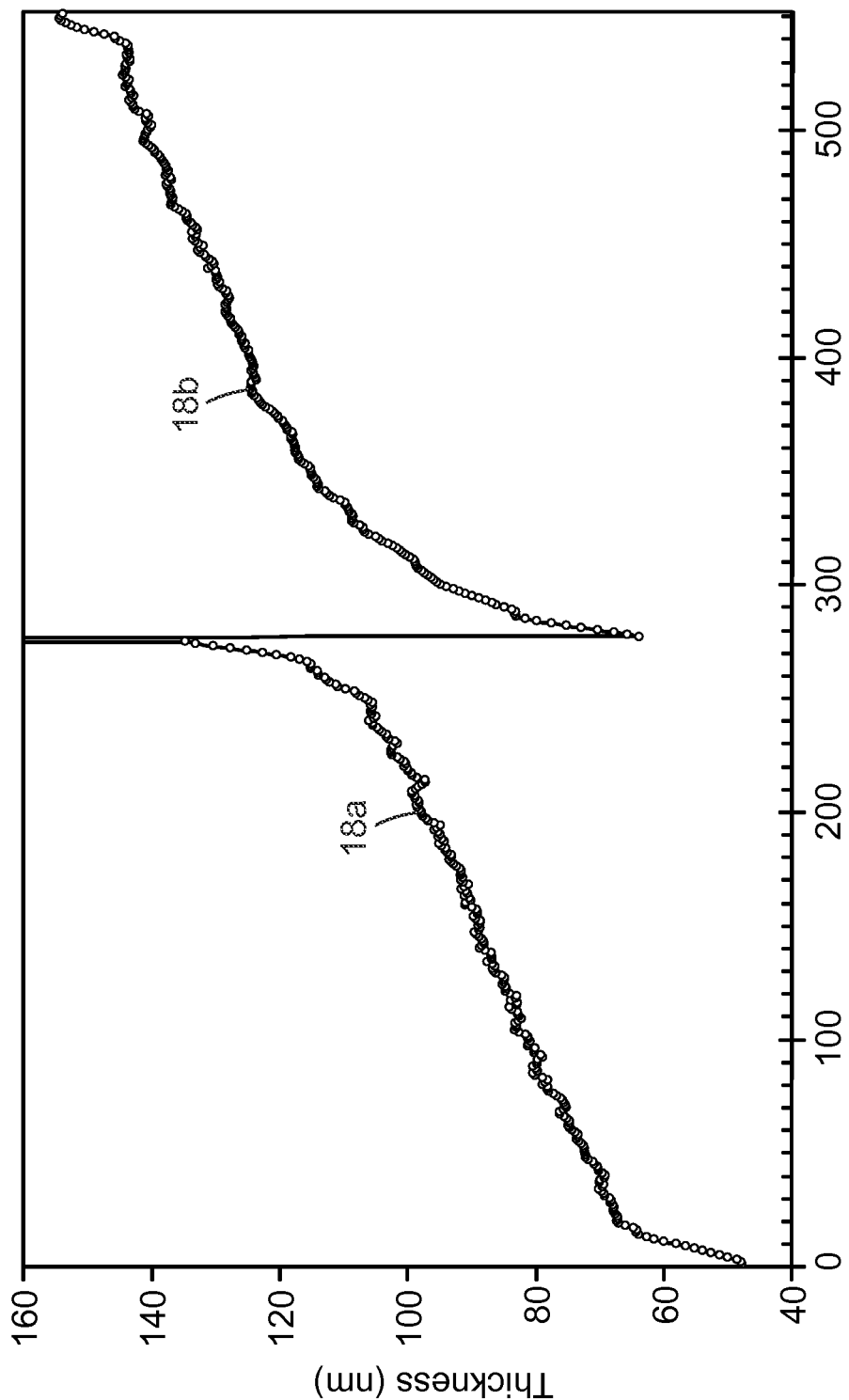
FIG. 18 is a layer profile thickness graph of an optical film having two apodized optical packets of Example 4.

The layer thickness values of the oriented film were measured using Atomic Force Microscopy (AFM), and the layer thickness profiles 18a and 18b for packets 1 and 2 are shown in FIG. 18.

Figure 19:
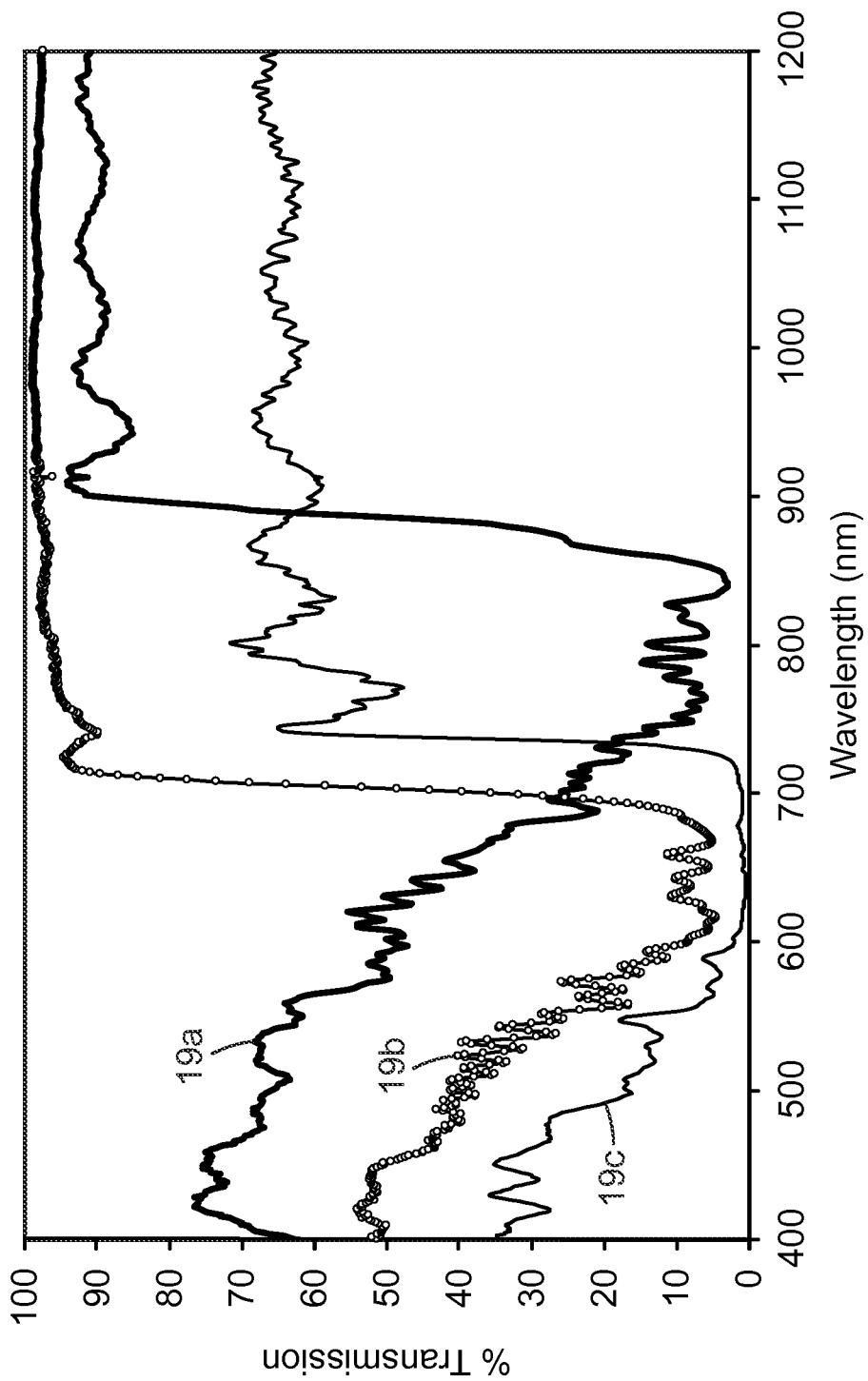
FIG. 19 is a graph of the spectra resulting from the layer thickness profile of FIG. 18.

The pass axis spectrum 19a for normal incidence light was plotted in FIG. 19. The transmission at 60 degrees for p-pol and s-pol light were plotted as curves 19b and 19c respectively.

The average transmission values listed for each measurement (% T) were estimated by averaging the transmission values of each spectrum between 420 nm and 680 nm. No photopic weighting was used, although this could be applied if desired. The average % T values for this example were: for p-pol: 59% at 0 deg, dropping to 27% at 60 deg, and for s-pol: 59% at 0 deg. dropping to 13% at 60 deg. The ratios of the values of $T_{60}/T_{00}$ for p-pol and s-pol light were 0.46 and 0.22 respectively. The values of the percent transmission for these angles and polarizations are also given in Table 2 for Examples 3, 4 and 5.

Figure 20:
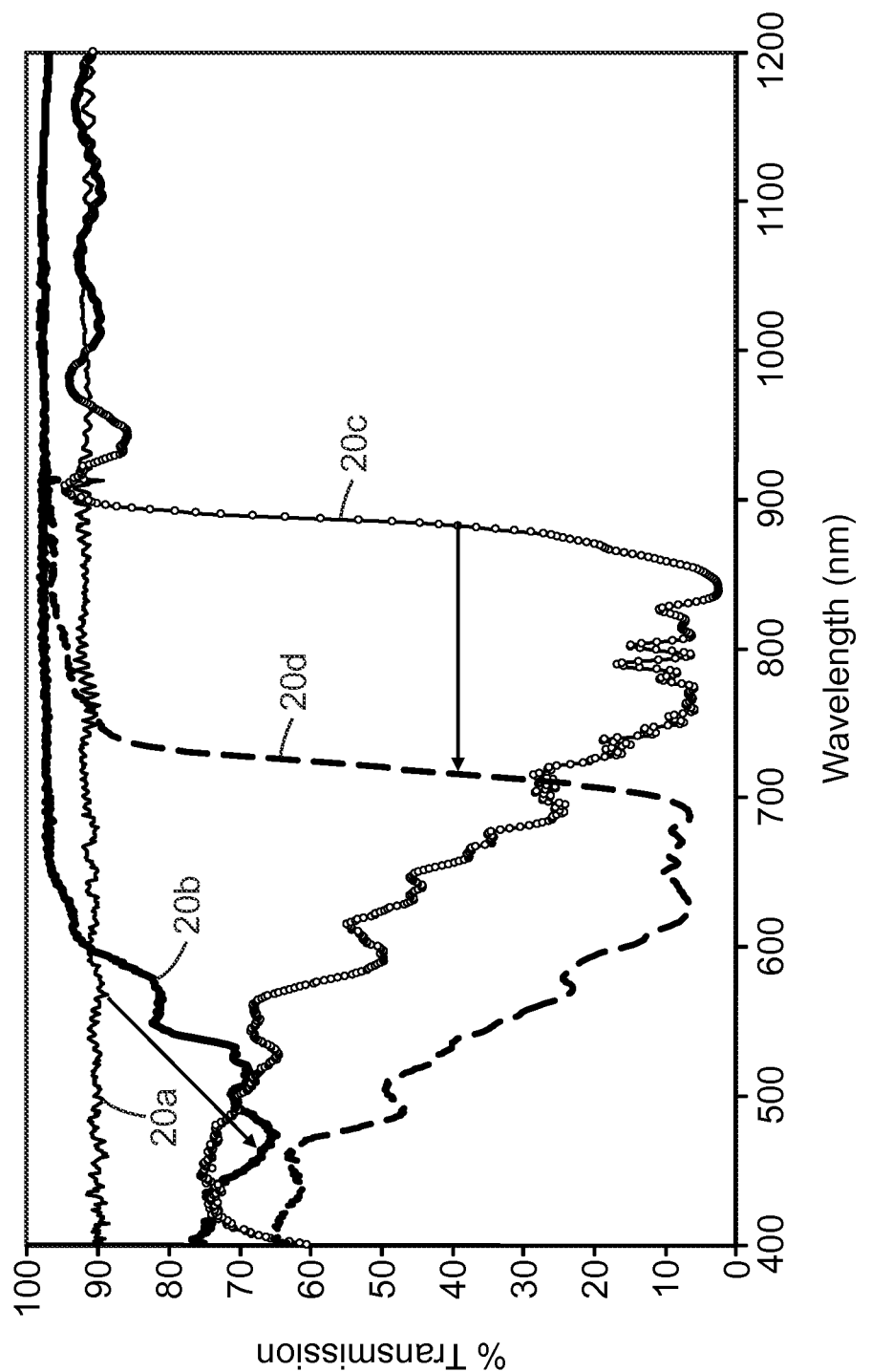
FIG. 20 is another graph of the spectra resulting from the layer thickness profile of FIG. 18.

The spectra 20a and 20b for packet 1, and spectra 20c and 20d for packet 2, measured from the pass axis at 0 and 60 degrees for p-polarized light are shown in FIG. 20. Note that packet 1 had essentially no reflectivity at normal incidence (except for the skin/air interfaces), but R increased substantially with increasing incidence angle. Packet 2 had essentially no increase in reflectivity with angle, and the spectrum only shifts to the left with increasing angle. The reflections from the air interfaces of these film specimens were ignored for this evaluation.

Figure 21:
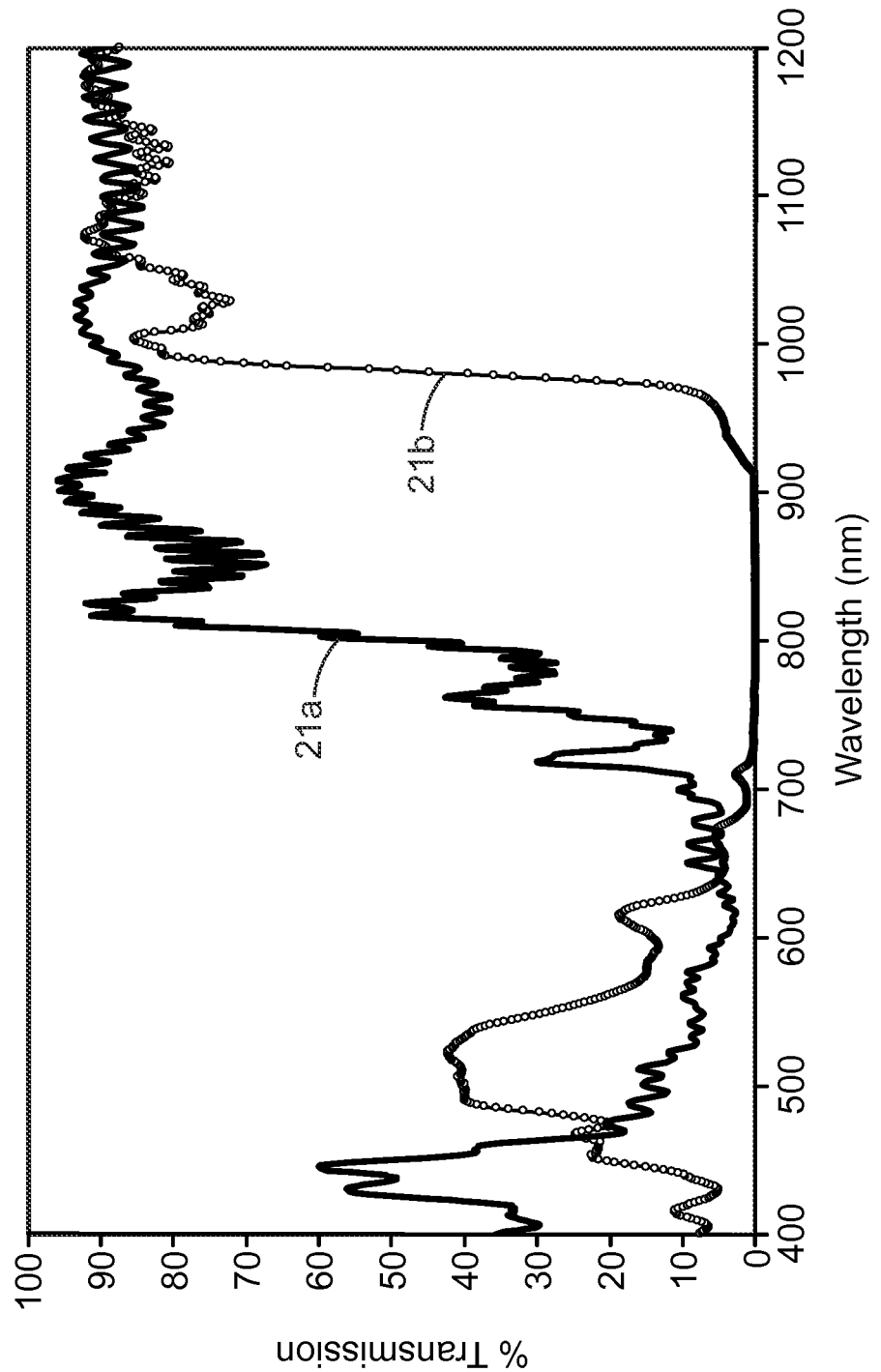
FIG. 21 is another graph of the spectra resulting from the layer thickness profile of FIG. 18.

The large slope of the spectrum requires very high transmission of light in the blue and good collimation of recycled blue light also requires that the reflectivity of packet 1 increases more rapidly with angle than does the reflectivity of packet 2 for this film design. From FIG. 20, the approximate increase in reflectivity at 60 degrees compared to normal incidence was about a factor of 12× for packet 1 and about 0× for packet 2. These values were obtained from the following estimated transmission values for the two packets:

$R_0 \approx 2\%, R60 \approx 25\%, \Delta R \approx 12\times$   Packet 1:

$R_0 \approx R60, \Delta R \approx 0\times.$   Packet 2:

The block axis spectra 21a and 21b for packets 1 and 2 respectively were plotted in FIG. 21. The spectrum of packet 1 is desirably flatter than what was achieved here and an average % T for packet 1 of substantially less than 10% is possible. Also note that some $2^{nd}$ order harmonic reflectivity from the thick layers of packet 2 assisted in lowering the block axis transmission in the wavelength range of 400 to 480 nm. $2^{nd}$ order harmonic reflectivity arises from stacks having an f-ratio that is above or below 0.5.

Example 5

Coextruded Polymeric Film

Using the method described above for Example 3, two packets of 275 layers each of alternating low and high index polymer layers were coextruded as a cast web and then stretched in a tenter on a continuous film making line. The high index material was a 90/10 coPEN (90% naphthalate units and 10% teraphthalate units). The low index material differed between packet 1 and packet 2 of the microlayers. The low index material for packet 1 was PETg (EASTAR GN071 copolyester from Eastman Chemical, Kingsport, Tenn.) with an index of 1.564. The low index material for packet 2 was an isotropic co-PET made in-house specifically to have a measured index of 1.54. All indices were measured at 633 nm.

Figure 22:
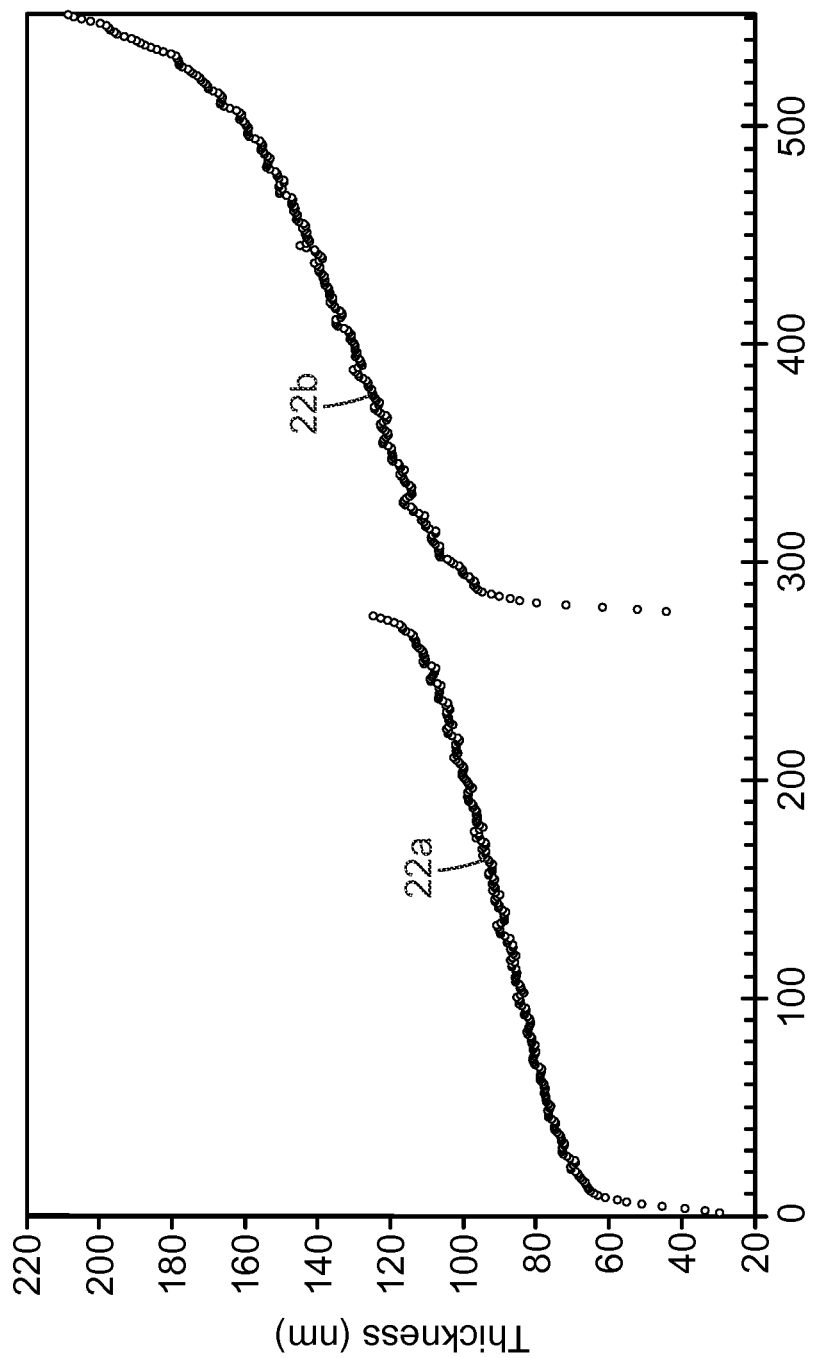
FIG. 22 is a layer profile thickness graph of an optical film having two apodized optical packets of Example 5.

The layer thickness values of the oriented film were measured using Atomic Force Microscopy (AFM), and the layer thickness profiles 22a and 22b for packets 1 and 2 respectively are shown in FIG. 22.

Figure 23:
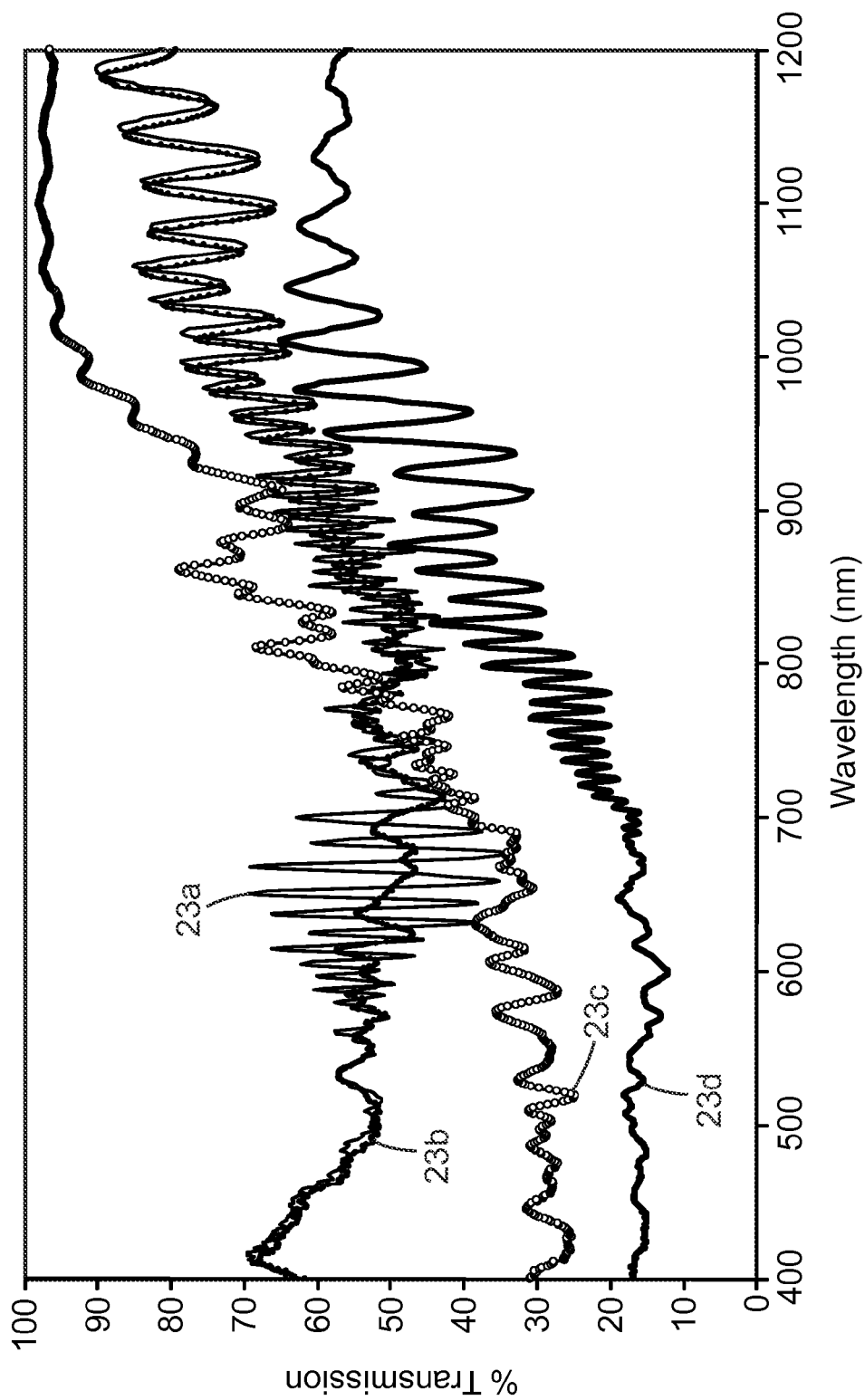
FIG. 23 is a graph of the spectra resulting from the layer thickness profile of FIG. 22.

The pass axis spectrum 23b for normal incidence light was plotted in FIG. 23. The transmission at 60 degrees for p-pol and s-pol pass axis light were plotted as curves 23c and 23d respectively. An additional spectrum is also shown in this figure. Spectrum 23a is the pass axis transmission spectrum obtained from of the original as-oriented film whereas the spectrum 23b was obtained after first separating and then rejoining the two packets with a thick optical adhesive. The original film had spectral ringing in the spectral overlap region of the two film packets, similar to the modeled spectra of FIG. 10. The ringing in this example was eliminated by the insertion of the 100 micrometer of optical adhesive between the two packets.

The average transmission values listed for each measurement (% T) were estimated by averaging the transmission values of each spectra between 420 nm and 680 nm. No photopic weighting was used, although this could be applied if desired. The average % T values for this example were: for p-pol: 54% at 0 deg, dropping to 31% at 60 deg, and for s-pol: 54% at 0 deg. dropping to 16% at 60 deg. The ratios of the values of $T_{60}/T_{00}$ for p-pol and s-pol light were 0.57 and 0.29 respectively.

Figure 24:
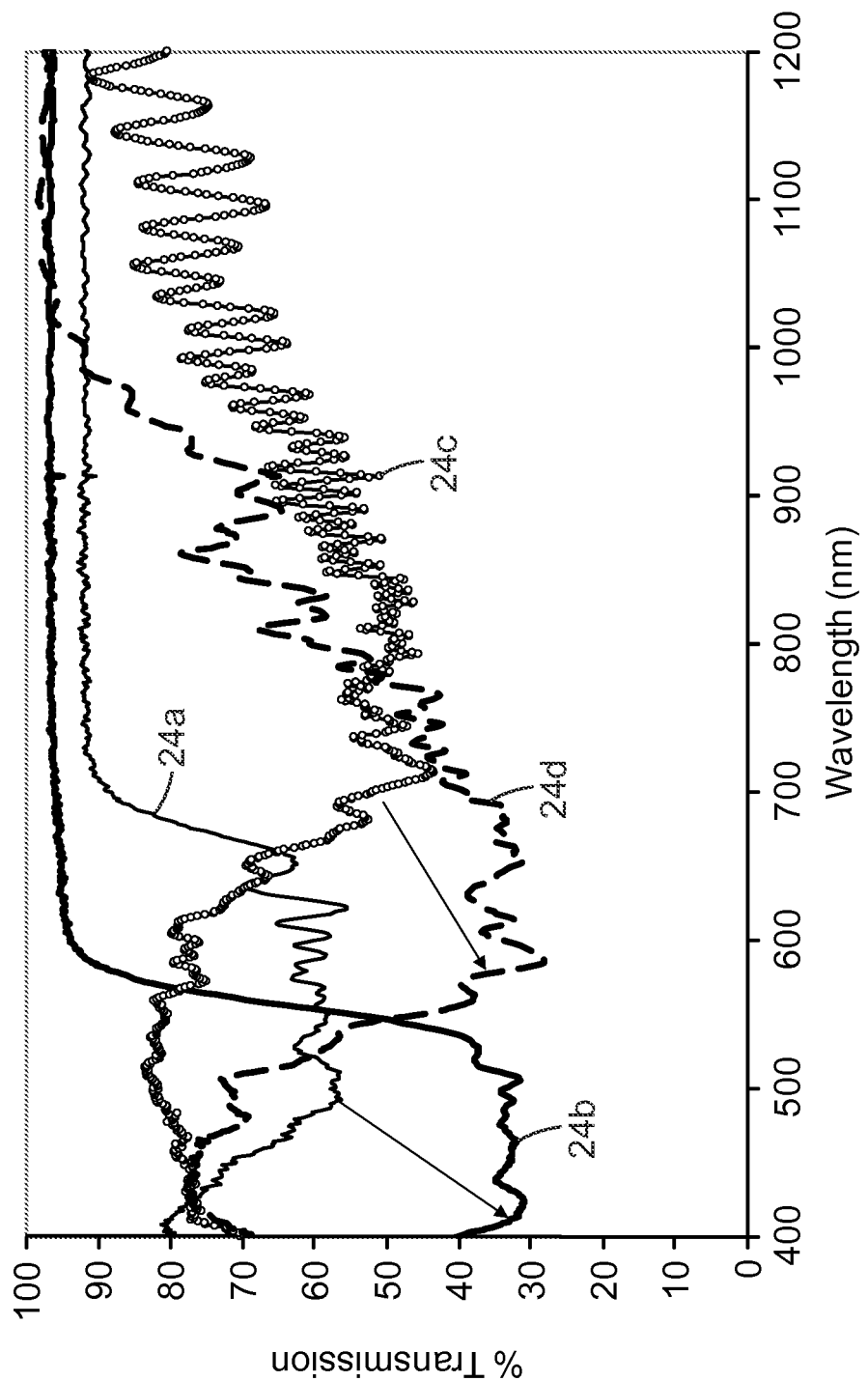
FIG. 24 is another graph of the spectra resulting from the layer thickness profile of FIG. 22.

The spectra 24a and 24b for packet 1, and spectra 24c and 24d for packet 2, measured from the pass axis at 0 and 60 degrees for p-polarized light are shown in FIG. 24.

Note that packet 1 had a relatively flat spectrum but packet 2 exhibited a sloped spectrum from shorter to longer wavelengths. The reflectivity of both packets increased substantially with angle of incidence. The reflections from the air interfaces of these film specimens were ignored for this evaluation.

From FIG. 24, the approximate increase in reflectivity at 60 degrees compared to normal incidence was about a factor of 2× for packet 1 and about 1.5× for packet 2. These values were obtained from the following estimated transmission values for the two packets:

Packet 1: $R0 \approx 30\%, R60 \approx 60\%, \Delta R \approx 2\times$

Packet 2: $R0 \approx 40\%, R60 \approx 70\%, \Delta R \approx 1.5\times$

In general, the apodization technique described above is effective in reducing the spectral disruption on the wavelength scale where two multilayer stacks are joined. Improvements in extrusion equipment can provide for overall improvements in the shape of the spectral transmission curves by reducing the short term variations in the layer profiles.

The apodization technique also provides for the smooth joining of spectra with stacks that are constructed of differing materials having differing indices of refraction and having different spectral response shapes. From Table 2, the difference in the change in reflectivity (60 deg vs. 0 deg) for p-polarized light for packet 1 vs. packet 2 can be as large as 12× vs. 0× or as little as 2× vs. 1.5× for packet 1 vs. packet 2, and the spectrally stitched spectra have substantially the same degree of smoothness for all polarizations and angles of incidence.

The Examples have demonstrated film constructions whose overall ratios of transmission at 60 degrees vs. 0 degrees for polarized light can vary from 0.22 to 0.62. Ratios as low as 0.1 are possible with films of this construction.

TABLE 2

| Example | Transmission (%) | | | ratio T60/T00 | | ΔR | |
|---|---|---|---|---|---|---|---|
| | T00 | T60 p | T60 s | p-pol | s-pol | pac 1 | pac 2 |
| 3 | 75 | 46 | 36 | 0.62 | 0.48 | 3X | 1.5X |
| 4 | 59 | 27 | 13 | 0.46 | 0.22 | 12X | 0X |
| 5 | 54 | 31 | 16 | 0.57 | 0.29 | 2X | 1.5X |

Apodized Profile Overlap

The overlap of two adjacent apodized layer thickness profiles can be summarized more quantitatively with a single numerical value in the following manner.

Packet 1 has layers numbered from 1 to N1 of thickness values P1(n) where n is from 1 to N1. Packet 2 has layers numbered from 1 to N2 of thickness values P2(n) where n is from 1 to N2. Thickness values can be optical thickness or physical thickness. Alternatively, ORU thickness values can be used, with the corresponding reduction in the values of N1 and N2.

The two layers adjacent the intermediate layer are P1(N1) and P2(1) and they have an average value of Avg=[P1(N1)+P2(1)]/2. The invention describes film packet combinations where the difference of the first two adjacent layers of P1 and P2, Diff=[P1(N1)−P2(1)]>0. It was been found that for desirable spectral overlap and smooth spectra, Diff/Avg>0.2 and can be as high as 1.0 or higher.

The degree of overlap of the entire two stacks (apodizing profiles plus baseline profiles) can be described by a number "C" where C is a crossover layer number (or ORU number) that is found in the following manner:

Going down the profile of packet 1 from layer N1 to thinner layers one by one, and up the profile of packet 2 to thicker layers in the same manner, the thickness difference [P1(N1−n)−P2(n)] can be evaluated for each successive number n. Initially, this difference must be greater than zero for overlapping apodized packets. At a value we define as n=C, this difference will change from positive to zero or negative. The magnitude of this number C is a good numerical indication of the degree of overlap of the two packets.

For example, if the two packets are identical in every respect and with N layers each, [P1(N1−n)−P2(n)]=0 for n=N/2=C.

Apodizing profiles are useful for combining two distinct multilayer reflective stacks in a manner that provides for a seamless combination of their two separate spectra. In one embodiment these can be two stacks that reflect over substantially different wavelength ranges, but are apodized and overlapped so as to provide for a continuous and much wider reflection spectrum than can be achieved with one of the individual stacks with the desired reflectivity. It has been found that to provide for such a reflector the value of C is typically in the range of 0.05*N to 0.2*N, where N is the larger value of N1 and N2.

In other embodiments, the seamless combination of two reflecting stacks can result in the same or similar bandwidth of only one of the stacks. For example, an apodized packet can be used to increase the reflectivity in part or all of the wavelength range of the other packet without introducing a substantial spectral disruption. It has been found that in this case the value of C can be as large as 0.5*N, or larger, if the two packets have differing layer profiles. Intermediate cases can require values of C ranging from 0.2 to 0.5. In such cases, the design goal would be to provide for a higher level of reflectivity over part or all of the reflection band of one of the stacks with little or no extension of the bandwidth. Such combined film stacks without apodization are described in PCT filed application US2011/035967 entitled "Partially Reflecting Multilayer Optical Films With Reduced Color." The film stacks described therein can benefit from the use of apodizing profiles on either the thin end or on the thick end or on both ends of each packet.

The numerical values of C for Examples 1 through 5 are summarized in Table 3. All layer thickness values are in nm, but note that Example 1 values are for optical thickness of each layer whereas the numbers for Examples 2 through 5 are thickness values for individual layers as reported by AFM.

TABLE 3

| Example | P1(275) | P2(1) | Diff | Avg | Avg/Diff | C | fraction |
|---|---|---|---|---|---|---|---|
| #1 | 223.4 | 122.1 | 101.2 | 172.7 | 0.59 | 25 | 0.091 |
| #2 | 132.0 | 74.5 | 57.5 | 103.2 | 0.56 | 29 | 0.105 |
| #3 | 148.9 | 46.4 | 102.5 | 97.7 | 1.05 | 38 | 0.138 |
| #4 | 135.0 | 64.1 | 70.9 | 99.5 | 0.71 | 43 | 0.156 |
| #5 | 124.9 | 44.5 | 80.5 | 84.7 | 0.95 | 32 | 0.116 |

Reverse Stack Designs

The stack design of overlapped packets illustrated in FIG. 7 has packet 1 thinner (tuned to shorter wavelengths on average) than packet 2, which is tuned to longer wavelengths on average than packet 1. Packet 1 includes layer profiles 7f, 7a and 7c and packet 2 includes layer profiles 7d, 7b and 7g. However, packet 1 could be made thicker and packet 2 made thinner such that the wavelength ranges of the two packets are swapped with one another but with substantially the same overall wavelength range coverage for the combined stack. Physically, this would be equivalent to laminating the packets in reverse order with profiles 7g and 7f adjacent the intermediate layer 7e, assuming all the apodizing profiles were similar. For consistency of description however, we will assume that all the layer profiles remain in the same order as in FIG. 7 but that packet 1 is now the thicker packet. For combined stacks with such a reverse order, the spectrally overlapping layer profiles are the apodizing profiles 7f and 7g and their adjacent layers in the baseline profiles. By optical modeling we have found that this arrangement is also effective in providing for a smooth combination of the spectra of two film stacks, but the spectral disruption may be more sensitive with respect to the variation in the relative thickness values of packet 1 and packet 2. Also, if the materials have significant optical absorbance this can be a less efficient reflector if the shorter wavelength light enters the stack at layer 1 of packet 1. However, with the reverse packet arrangement, the thickness of the intermediate layer has little or no effect on the spectrum in the region of spectral overlap, but it can reduce the ringing at the shortest resonance wavelength values of packet 2 if it is thicker than about 5 micrometers or 10 micrometers. Those shortest wavelengths are, in this case, reflected by layer profile 7d and adjacent layers in 7b.

The crossover layer number C for a reverse stack can be determined by an analogous counting and comparison procedure outlined above for the standard packet arrangement of FIG. 7, using the layers adjacent the opposing surfaces of the combined stack. In this case, the average value of the outer layers is Avg=[P2(N2)+P1(1)]/2. The maximum overlap is given by the difference value Diff=[P2(N2)−P1(1)]. The overlap layer number is found when the value of Diff=[P2(N2−n)−P1(n)]<0 for some value of n which is defined as the overlap layer number C.

The apodizing profiles described herein are intended for broadband reflectors that are constructed with a graded layer thickness baseline profile and exhibit in-band ripple. Instead of a graded thickness apodizing profile, the apodizing function can also be achieved with a graded index profile on the ends of the baseline layer thickness profile. With a graded index profile, the ORU thickness values do not necessarily deviate from the baseline profile, the index difference Δn simply approaches zero on the end of the stack. The gradation of Δn can follow an exponential profile or other profile similar to the ones described above for thickness graded apodizing profiles. The graded index profile can be real or virtual. An example of a virtual graded index is a gradation of the f-ratio of the stack throughout the ORUs of the apodizing profile. Combinations of graded index and graded layer thickness profiles can also be used as apodizing profiles.

Thus, embodiments of APODIZED BROADBAND PARTIAL REFLECTORS HAVING DIFFERING OPTICAL PACKETS are disclosed. One skilled in the art will appreciate that the optical films and film articles described herein can be practiced with embodiments other than those disclosed. The disclosed embodiments are presented for purposes of illustration and not limitation.

What is claimed is:

1. A multilayer polymeric optical film broadband reflector comprising:
   a first multilayer polymeric optical film having a total number of optical repeating units from a first side to a second side of the first multilayer polymeric optical film, wherein the optical repeating units in the first multilayer polymeric optical film have a first optical repeat unit thickness that is the sum of the optical thicknesses of the constituent layers thereof, the first multilayer polymeric optical film having a first baseline optical repeating unit thickness profile and a first apodized optical repeating unit thickness profile monotonically deviating from the first baseline optical repeating unit thickness profile and defining the second side of the first multilayer polymeric optical film, wherein the first apodized optical repeating unit thickness profile is exponential;
   an intermediate layer on the second side of the multilayer polymeric optical film; and
   a second multilayer polymeric optical film having a total number of optical repeating units from a first side to a second side of the second multilayer polymeric optical film, wherein the optical repeating units in the second multilayer polymeric optical film have a second optical repeat unit thickness that is the sum of the optical thicknesses of the constituent layers thereof, the second multilayer polymeric optical film having a second baseline optical repeating unit thickness profile and a second apodized optical repeating unit thickness profile monotonically deviating from the second baseline optical repeating unit thickness profile and defining the first side of the second multilayer polymeric optical film, wherein the second apodized optical repeating unit thickness profile has an average slope at least five times greater than an average slope of the second baseline optical repeating unit thickness profile, and the first side of the second multilayer polymeric optical film on the intermediate layer, the intermediate layer separating the first multilayer polymeric optical film from the second multilayer polymeric optical film.

2. The reflector according to claim 1, wherein the first apodized optical repeating unit thickness profile overlaps the second baseline optical repeating unit thickness profile.

3. The reflector according to claim 2, wherein the second apodized optical repeating unit thickness profile overlaps the first baseline optical repeating unit thickness profile.

4. The reflector according to claim 1, wherein the first baseline optical repeating unit thickness profile does not overlap the second baseline optical repeating unit thickness profile.

5. The reflector according to claim 1, wherein the first baseline optical repeating unit thickness profile's thickest optical repeating unit has a thickness value that is within 10% of the thinnest optical repeating unit of the second baseline optical repeating unit thickness profile.

6. The reflector according to claim 5, wherein the thickest optical repeating unit of the first baseline optical repeating unit thickness profile is adjacent to the second side of the first multilayer polymeric optical film and the thinnest optical repeating unit of the second baseline optical repeating unit thickness profile is adjacent to the first side of the second multilayer polymeric optical film.

7. The reflector according to claim 1, wherein the second apodized optical repeating unit thickness profile is exponential.

8. A multilayer polymeric optical film broadband reflector comprising:
   a first multilayer polymeric optical film having a total number of optical repeating units that monotonically increases in thickness value from a first side to a second side of the first multilayer polymeric optical film, wherein the optical repeating units in the first multilayer polymeric optical film have a first optical repeat unit thickness that is the sum of the optical thicknesses of the constituent layers thereof, the first multilayer polymeric optical film having a first baseline optical repeating unit thickness profile and a first apodized optical repeating unit thickness profile defining the second side of the first multilayer polymeric optical film, wherein the first apodized optical repeating unit thickness profile is exponential;
   an intermediate layer on the second side of the multilayer polymeric optical film; and
   a second multilayer polymeric optical film having a total number of optical repeating units that monotonically increases in thickness value from a first side to a second side of the second multilayer polymeric optical film, wherein the optical repeating units in the second multilayer polymeric optical film have a second optical repeat unit thickness that is the sum of the optical thicknesses of the constituent layers thereof, the second multilayer polymeric optical film having a second baseline optical repeating unit thickness profile and a second apodized optical repeating unit thickness profile defining the first side of the second multilayer polymeric optical film, wherein the second apodized optical repeating unit thickness profile is exponential, and the first side of the second multilayer polymeric optical film on the intermediate layer and the intermediate layer separating the first multilayer polymeric optical film from the second multilayer polymeric optical film.

9. The reflector according to claim 8, wherein the first apodized optical repeating unit thickness profile overlaps the second baseline optical repeating unit thickness profile.

10. The reflector according to claim 9, wherein the second apodized optical repeating unit thickness profile overlaps the first baseline optical repeating unit thickness profile.

11. The reflector according to claim 8, wherein the first baseline optical repeating unit thickness profile does not overlap the second baseline optical repeating unit thickness profile.

12. The reflector according to claim 8, wherein the first baseline optical repeating unit thickness profile's thickest optical repeating unit has a thickness value that is within 5% of the thinnest optical repeating unit of the second baseline optical repeating unit thickness profile.

13. The reflector according to claim 11, wherein the thickest optical repeating unit of the first baseline optical repeating unit thickness profile is adjacent to the second side of the first multilayer polymeric optical film and the thinnest optical repeating unit of the second baseline optical repeating unit thickness profile is adjacent to the first side of the second multilayer polymeric optical film.

14. A multilayer polymeric optical film broadband reflector comprising:
   a first multilayer polymeric optical film having a total number of optical repeating units from a first side to a second side of the first multilayer polymeric optical film and formed from a first material set, wherein the optical repeating units in the first multilayer polymeric optical film have a first optical repeat unit thickness that is the sum of the optical thicknesses of the constituent layers thereof, the first multilayer polymeric optical film having a first baseline optical repeating unit thickness profile and a first apodized optical repeating unit thickness profile monotonically deviating from the first baseline optical repeating unit thickness profile and defining the second side of the first multilayer polymeric optical film, wherein the first apodized optical repeating unit thickness profile is exponential;
   an intermediate layer on the second side of the multilayer polymeric optical film; and
   a second multilayer polymeric optical film having a total number of optical repeating units from a first side to a second side of the second multilayer polymeric optical film and formed from a second material set being different than the first material set, wherein the optical repeating units in the second multilayer polymeric optical film have a second optical repeat unit thickness that is the sum of the optical thicknesses of the constituent layers thereof, the second multilayer polymeric optical film having a second baseline optical repeating unit thickness profile and a second apodized optical repeating unit thickness profile monotonically deviating from the second baseline optical repeating unit thickness profile and defining the first side of the second multilayer polymeric optical film, wherein the second apodized optical repeating unit thickness profile is exponential, and the first side of the second multilayer polymeric optical film on the intermediate layer, the intermediate layer separating the first multilayer polymeric optical film from the second multilayer polymeric optical film.

15. The reflector according to claim 14, wherein the first apodized optical repeating unit thickness profile overlaps the second baseline optical repeating unit thickness profile.

16. The reflector according to claim 15, wherein the second apodized optical repeating unit thickness profile overlaps the first baseline optical repeating unit thickness profile.

17. The reflector according to claim 14, wherein the first baseline optical repeating unit thickness profile's thickest optical repeating unit has a thickness value that is within 10% of the thinnest optical repeating unit of the second baseline optical repeating unit thickness profile.

* * * * *